US010771372B2

(12) United States Patent
Hill et al.

(10) Patent No.: US 10,771,372 B2
(45) Date of Patent: Sep. 8, 2020

(54) TRANSMITTING TEST TRAFFIC ON A COMMUNICATION LINK

(71) Applicant: Oracle International Corporation, Redwood Shores, CA (US)

(72) Inventors: Peter John Hill, Seattle, WA (US); Lukasz Sulek, Redmond, WA (US); Albert A Arcuino, Mercer Island, WA (US)

(73) Assignee: Oracle International Corporation, Redwood Shores, CA (US)

( * ) Notice: Subject to any disclaimer, the term of this patent is extended or adjusted under 35 U.S.C. 154(b) by 96 days.

(21) Appl. No.: 15/184,918

(22) Filed: Jun. 16, 2016

(65) Prior Publication Data
US 2017/0366441 A1 Dec. 21, 2017

(51) Int. Cl.
H04L 12/26 (2006.01)
(52) U.S. Cl.
CPC ............ H04L 43/50 (2013.01); H04L 43/062 (2013.01)
(58) Field of Classification Search
CPC .............................. H04L 43/50; H04L 43/062
See application file for complete search history.

(56) References Cited

U.S. PATENT DOCUMENTS

| 5,805,571 A * | 9/1998 | Zwan | H04J 3/14 370/249 |
| 7,321,617 B2 * | 1/2008 | Garlett | H04B 17/101 375/224 |
| 2007/0195707 A1 * | 8/2007 | Cidon | H04L 43/50 370/252 |
| 2007/0233847 A1 * | 10/2007 | Aldereguia | H04L 12/2697 709/224 |
| 2009/0164657 A1 * | 6/2009 | Li | H04L 41/0896 709/233 |
| 2011/0131011 A1 * | 6/2011 | Blackledge | H04L 43/0888 702/186 |
| 2011/0161484 A1 * | 6/2011 | Van den Bogaert | H04L 43/0876 709/224 |

(Continued)

OTHER PUBLICATIONS

Lang, J., "Link Management Protocol (LMP)," available at https://www.ietf.org/rfc/rfc4204.txt (Oct. 2005).

Primary Examiner — Alex Skripnikov
Assistant Examiner — Sharmin Chowdhury
(74) Attorney, Agent, or Firm — Invoke

(57) ABSTRACT

Techniques for transmitting test traffic on a communication link are disclosed. A computer system includes at least two nodes, interconnected by a particular communication link. A test engine associated with one of the two nodes identifies a level of data traffic being transmitted on the particular communication link. Based on the level of data traffic, the test engine selects a level of test traffic to be transmitted on the particular communication link. The node associated with the test engine transmits the selected level of test traffic on the particular communication link. The test traffic is transmitted concurrently with the data traffic on the particular communication link. The node receiving the test feedback transmits test feedback. Based on the test feedback, the test engine generates test results for the particular communication link. The test engine determines and/or executes a corrective action based on the test results.

23 Claims, 11 Drawing Sheets

(56) References Cited

U.S. PATENT DOCUMENTS

| | | | |
|---|---|---|---|
| 2013/0136030 A1* | 5/2013 | Xiao | H04L 43/0888 370/253 |
| 2013/0293668 A1* | 11/2013 | Gu | H04N 7/147 348/14.13 |
| 2015/0334030 A1* | 11/2015 | Vasseur | H04L 47/115 370/230 |
| 2016/0344608 A1* | 11/2016 | Siemens | H04L 43/12 |

* cited by examiner

TRANSMITTING TEST TRAFFIC ON A COMMUNICATION LINK

BACKGROUND

A computer network includes various digital devices. A digital device may be an application-specific hardware device or a generic machine. Examples of application-specific hardware devices include a hardware router, a hardware firewall, and a hardware network address translator (NAT). A generic machine may execute various virtual machines and/or software applications. Digital devices within a computer network are connected by one or more links. Examples of links include a coaxial cable, an unshielded twisted cable, a copper cable, and an optical fiber.

Link performance may degrade due to a change in physical properties of the link (e.g., physical properties of cables and/or fibers). An error on any one of the links may affect the throughput of data traffic in a computer network. The error may cause the data traffic to become corrupted and/or lost. Examples of errors include: a loss of continuity within a particular link; a disconnection between a particular link and an digital device; and attention, dispersion, or other loss within a particular link that is above an acceptable threshold.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1A:
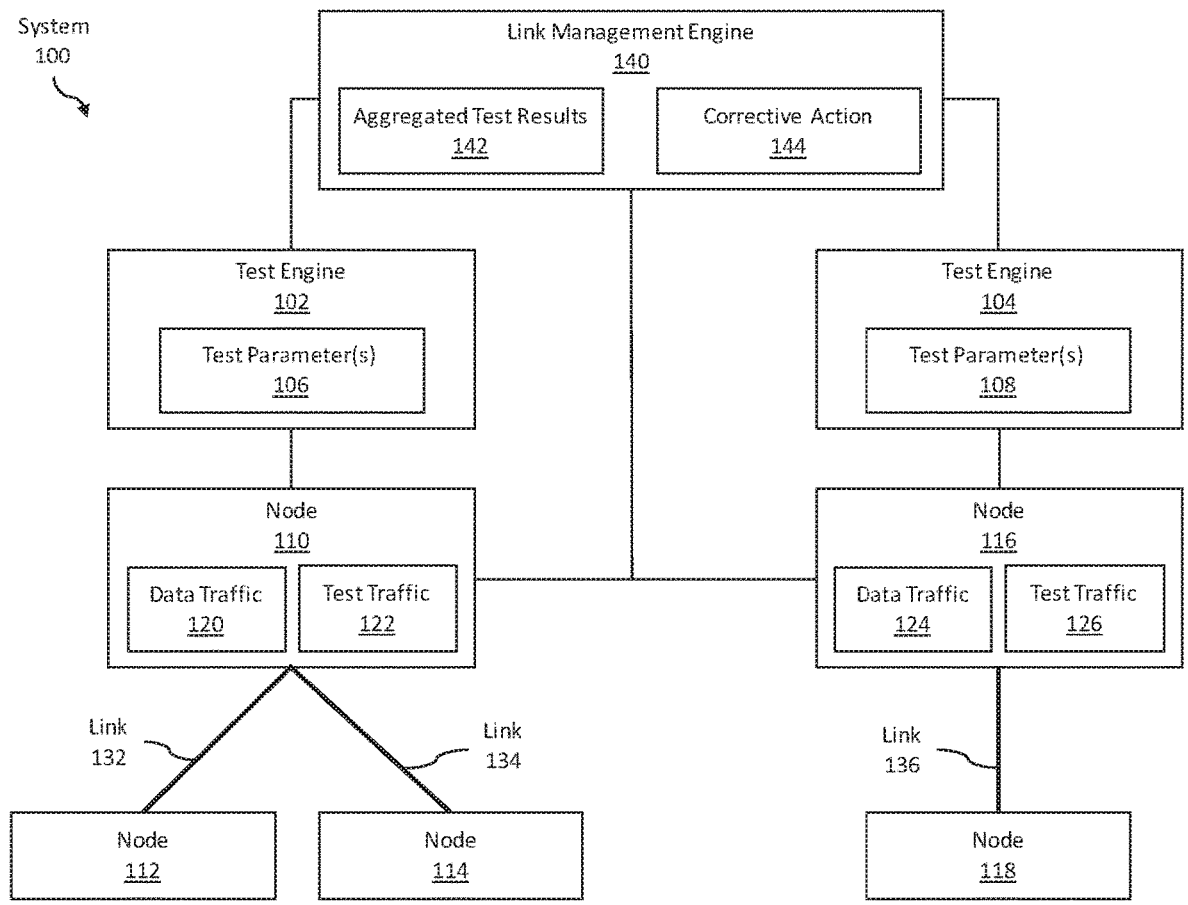
FIG. 1A illustrates a communication link test system, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. COMMUNICATION LINK TEST SYSTEM
3. TRANSMITTING TEST TRAFFIC ON A COMMUNICATION LINK
4. EXAMPLE EMBODIMENT
5. CLOUD COMPUTING NETWORKS
6. MISCELLANEOUS; EXTENSIONS
7. HARDWARE OVERVIEW

1. General Overview

One or more embodiments include selecting a test parameter for testing a communication link based on a level of data traffic on the communication link. A computer network includes at least two nodes connected by a communication link. One of the two nodes (referred to herein as a "master node") identifies a level of data traffic on the communication link. The master node selects a test parameter for testing the communication link based on the level of data traffic. Alternatively, another node, different than the two nodes corresponding to the communication link, may identify the level of traffic and/or select the test parameter. Examples of test parameters include a level of test traffic, a duration of testing, a type of test feedback, and whether the test is unilateral or bilateral. The master node implements a function that (1) accepts the level of data traffic as an input parameter, and (2) outputs a value for the test parameter to be used in testing the communication link. As an example, a particular function may compute a level of test traffic that is inversely proportional to the level of data traffic. The master node transmits test traffic, according to the selected test parameter, concurrently with the data traffic on the communication link. The other node on the communication link (also referred to herein as a "slave node") receives the test traffic. The slave node transmits responses back to the master node based on the received test traffic. The responses to test traffic are referred to herein as "test feedback". Based on the test feedback, the master node determines test results for the communication link. The slave node may not necessarily be able to distinguish between data traffic and test traffic. The slave node may process the test traffic similar to the data traffic, and provide responses accordingly.

If bilateral testing is performed, the slave node may also transmit test traffic to the master node. The master node transmits test feedback based on the received test traffic. Based on the test feedback, the slave node determines at least a portion of the test results for the communication link. The test results for the communication link includes: (a) the test results for test traffic transmitted from the master node to the slave node and (b) the test results for test traffic transmitted from the slave node to the master node, During the transmission of the test traffic (in either direction on the communication link), the master node and/or the slave node monitor a level of data traffic on the communication link. If there is a change in the level of data traffic, then the master node and/or the slave node may modify the test parameter. The test traffic transmitted on the communication link is modified according to the modified test parameter. Accordingly, the test traffic is adapted in real-time based on changes in the level of data traffic.

One or more embodiments include executing a corrective action based on a test result for one or more communication links. A link management engine aggregates test results for multiple communication links. Based on the aggregated test results, the link management engine performs one or more of the following: deactivate a communication link, steer a portion of data traffic from one communication link to another communication link, and/or transmit an error message. Additional or alternative corrective actions may also be performed.

One or more embodiments described in this Specification and/or recited in the claims may not be included in this General Overview section.

2. Communication Link Test System

FIG. 1A illustrates a communication link test system 100, in accordance with one or more embodiments. As illustrated in FIG. 1A, system 100 includes test engine 102-104, link management engine 140, nodes 110-118, and links 132-136. In one or more embodiments, system 100 may include more or fewer components than the components illustrated in FIG. 1A. The components illustrated in FIG. 1A may be local to or remote from each other. The components illustrated in FIG. 1A may be implemented in software and/or hardware. Each component may be distributed over multiple applications and/or machines. Multiple components may be combined into one application and/or machine. Operations described with respect to one component may instead be performed by another component.

In one or more embodiments, a node (such as, nodes 110-118) is any digital device within a computer network. A node may be an application-specific hardware device or a generic machine. Examples of application-specific hardware devices include a server, a hardware router, a hardware firewall, and a rack switch, a cluster switch. A generic machine may execute one or more virtual machines and/or software applications.

As used herein, the term "digital device" generally refers to any hardware device that includes a processor. Examples of digital devices include a computer, a tablet, a laptop, a desktop, a netbook, a server, a web server, a network policy server, a proxy server, a generic machine, a hardware router, a hardware switch, a hardware firewall, a hardware firewall, a hardware network address translator (NAT), a hardware load balancer, an application-specific hardware device, a mainframe, a television, a content receiver, a set-top box, a printer, a mobile handset, a smartphone, and a personal digital assistant (PDA).

Each node may have one or more ports. A port is a particular interface of a node. Each port of a particular node is associated with a unique identifier, such as a port number. A frame and/or packet to be transmitted via a particular interface includes an identifier of the corresponding port. An identifier of the port may be included in, for example, an address of Layer 2 of the Open System Interconnection (OSI) model (such as, a Media Access Control (MAC) address). Additionally or alternatively, an identifier of the port may be included in an address of Layer 3 of the OSI model (such as, an Internet Protocol (IP) address)

In one or more embodiments, a communication link (such as, links 132-136) interconnects two nodes. As illustrated, for example, link 132 interconnects node 110 and node 112. Link 134 interconnects node 110 and node 114. Link 136 interconnects node 116 anal node 118. A link is configured to carry signals from one end of the link to the other end of the link. The signals are encoded with information, such as data traffic and test traffic, which are described below.

Examples of links include a coaxial cable, an unshielded twisted cable, a copper cable, and an optical fiber. A single link between two nodes may comprise multiple physical cables and/or fibers. Each cable and/or fiber interconnects a port of one node and a port of the other node. The link enables communications between multiple interfaces of the two nodes.

In an embodiment, various nodes and links are implemented to form a cloud computing network. A cloud computing network provides a pool of resources that are shared amongst multiple client devices. Examples of resources include a processor, server, data storage, virtual machine (VM), platform, and/or software application. The pool of resources may be geographically centralized and/or distributed. As an example, the pool of resources may be located at one or more datacenters. Client devices may independently request computing services, such as server time and network storage, as needed. The resources may be dynamically assigned to the requests and/or client devices on an on-demand basis. Additional embodiments and/or examples relating to cloud computing networks are described in Section 5, titled "Cloud Computing Networks."

In one or more embodiments, data traffic and/or test traffic may be stored across any nodes of a computer network. Further, data traffic and/or test traffic may be communicated through any links of a computer network. However, for purposes of clarity and explanation, data traffic 120 and test traffic 122 are illustrated within node 110. Data traffic 124 and test traffic 126 are illustrated within node 116.

In one or more embodiments, data traffic (such as, data traffic 120 or 124) includes, for example, archive data, database data, user data, metadata, software commands, and/or instructions. Data traffic may be transmitted over any layer of the OSI model (such as, Layer 2, 3, or 4). Data traffic may include information that is presented to a user via a user interface. As an example, a computer network may implement a sales application for multiple client devices. Data traffic may include sales transaction records, product information, and customer information. As another example, a computer network may implement an email system for a particular company. Data traffic may include incoming and outgoing emails of users associated with the particular company.

In one or more embodiments, test traffic (such as, test traffic 122 or 126) includes frames and/or packets that are being transmitted between two nodes for the purpose of testing an operation, performance, and/or quality of a link interconnecting the two nodes. Test traffic is transmitted on a communication link by a test engine, which is described below.

In one or more embodiments, a test engine (such as, test engine 102 or 104) refers to hardware and/or software configured to perform operations described herein for transmitting test traffic on a communication link. Examples of operations for transmitting test traffic on a communication link are described below with reference to FIG. 2.

A test engine is implemented on one or more digital devices. In an embodiment, a test engine for testing a particular link is implemented on one of the nodes connected to the particular link. In another embodiment, a test engine for testing a particular link is implemented on a node that is not one of the nodes connected to the particular link. In another embodiment, a test engine is implemented on a digital device that is not one of the nodes of a computer network. The test engine is communicatively coupled to at least one of the nodes of the computer network.

Figure 1B:
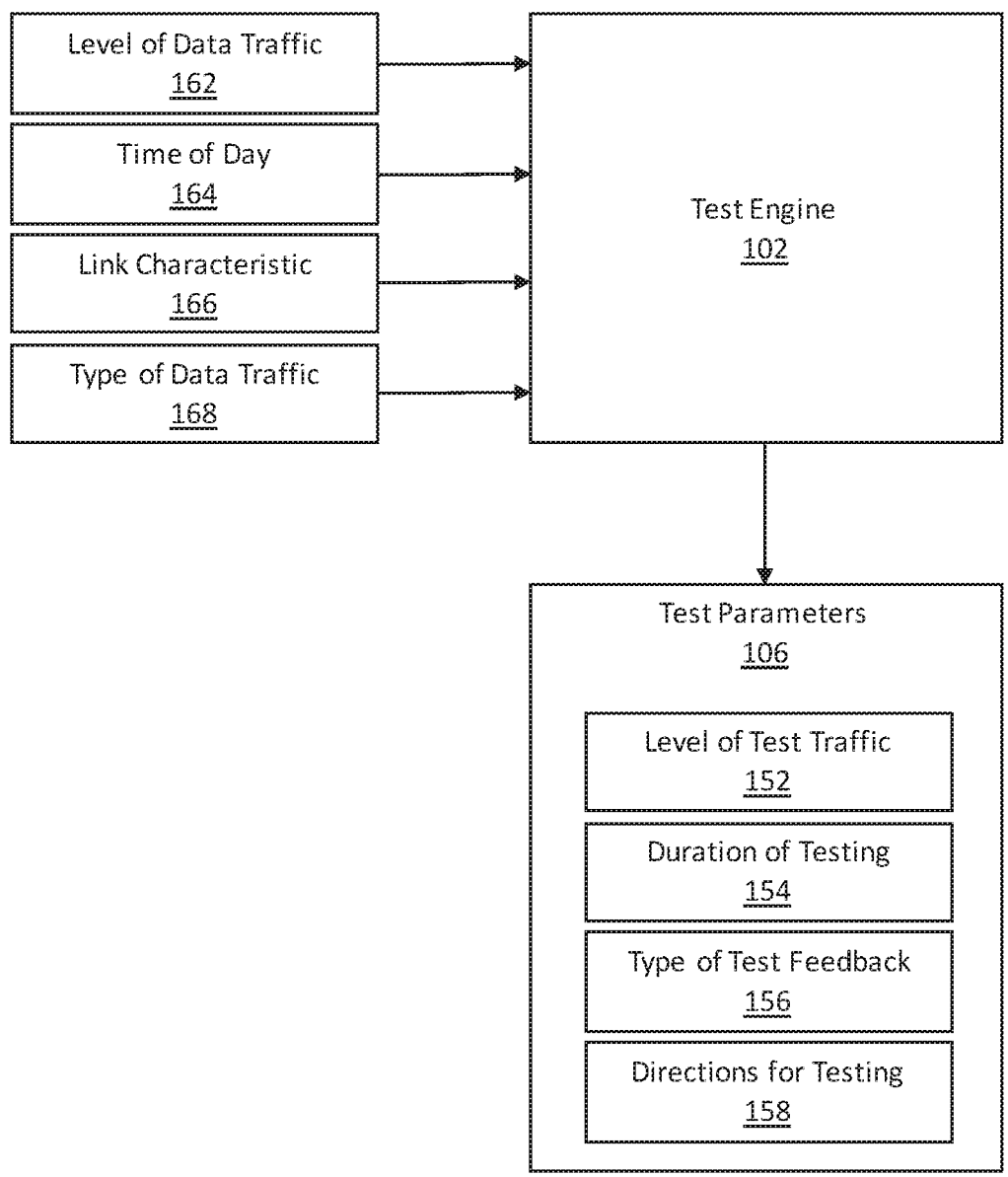
FIG. 1B illustrates a test engine configured to select a test parameter for testing a communication link, in accordance with one or more embodiments.

FIG. 1B illustrates a test engine 102 configured to select one or more test parameters 106 for testing a communication link, in accordance with one or more embodiments. Test engine 102 is configured to select test parameters 106 based on one or more input parameters.

A test parameter 106 is any setting, configuration, property, characteristic, and/or attribute associated with test traffic. As illustrated, for example, test parameters 106 include a level of test traffic 152. A level of test traffic 152 includes a transmission rate at which test traffic is transmitted on a communication link. The transmission rate may be measured in a number of bits, bytes, frames, and/or packets per a given time period. Additionally or alternatively, a level of test traffic 152 includes an amount of test traffic transmitted on a communication link. The amount of test traffic may be measured in a number of bits, bytes, frames, and/or packets.

Additionally or alternatively, test parameters 106 include a duration of testing 154. A duration of testing 154 may be a duration of time during which test traffic is transmitted over a communication link.

Additionally or alternatively, test parameters 106 include a type of test feedback 156. A type of test feedback 156 is a type of information that is transmitted in response to receiving test traffic. As an example, test feedback may be a checksum. A transmitting node may transmit test traffic to a receiving node. The receiving node may determine a checksum based on the data that was received. The receiving node may transmit the checksum as test feedback to the transmitting node. As another example, test feedback may be a full copy of the data that was received. A transmitting node may transmit test traffic to a receiving node. The receiving node may transmit a full copy of the data that was received as test feedback to the transmitting node.

Additionally or alternatively, test parameters 106 include one or more directions for testing 158. A test may be conducted in one direction (unilaterally) or two directions (bilaterally). In a unilateral test, testing includes transmitting test traffic from a particular node to another node, and transmitting test feedback from the other node to the particular node. In a bilateral test, testing includes transmitting test traffic in both directions. A particular node transmits test traffic to another node. The other node transmits test feedback to the particular node. The other node transmits test traffic to the particular node. The particular node transmits test feedback to the other node. The test traffic may be transmitted in the two directions simultaneously or sequentially.

An input parameter is any information from which test parameters 106 may be determined. As illustrated, for example, input parameters include a level of data traffic 162, a time of day 164, a link characteristic 166, and a type of data traffic 168.

A level of data traffic 162 includes a transmission rate at which data traffic is transmitted on a communication link. The transmission rate may be measured in a number of bits, bytes, frames, and/or packets per a given time period. Additionally or alternatively, a level of data traffic 162 includes an amount of data traffic transmitted on a communication link. The amount of data traffic may be measured in a number of bits, bytes, frames, and/or packets.

A link characteristic 166 is a characteristic of a communication link (such as, link 132-136). A link characteristic 166 may be a characteristic of a physical cable that implements a communication link. Examples of characteristics include a material (such as, copper), a temperature, and a length.

A type of data traffic 168 is a characteristic of the data traffic (such as data traffic 120 or 124), such as, the latency sensitivity of the data traffic, and a level of priority or importance of the data traffic. As an example, data traffic including audio and/or video data may be more latency sensitive to delays than data traffic including textual data.

Referring back to FIG. 1A, information describing test parameters may be stored across any components of system 100. However, for purposes of clarity and explanation, test parameter(s) 106 are illustrated within test engine 102. Test parameter(s) 108 are illustrated within test engine 104.

Test parameters (such as, test parameter(s) 106 or 108) may be stored within a data repository associated with a test engine. A data repository is any type of storage unit and/or device (e.g., a file system, database, collection of tables, or any other storage mechanism) for storing data. Further, the data repository may include multiple different storage units and/or devices. The multiple different storage units and/or devices may or may not be of the same type. The multiple different storage units and/or devices may or may not be located at the same physical site. Further, the data repository may be implemented or may execute on the same computing system as the test engine. Alternatively or additionally, the data repository may be implemented or executed on a computing system separate from the test engine. The data repository may be communicatively coupled to the test engine via a direct connection or via a network.

In one or more embodiments, a link management engine 140 refers to hardware and/or software configured to perform operations described herein for executing a corrective action based on a test result for a particular link and/or aggregated test results for multiple links. Examples of operations for executing a corrective action based on the test results are described below with reference to FIG. 2.

Information describing aggregated test results 142 and/or corrective action 144 may be stored across any components of system 100. However, for purposes of clarity and explanation, aggregated test results 142 and/or corrective action 144 are illustrated within link management engine 140.

Aggregated test results 142 includes test results aggregated from one or more test engines for multiple links. As illustrated, for example, test engine 102 may generate a set of test results for link 132 and another set of test results for link 134. Test engine 104 may generate a set of test results for link 136. Aggregated test results 142 may include the test results for each of link 132, link 134, and link 136.

Additionally or alternatively, aggregated test results 142 includes test results aggregated over a particular time period. Aggregated test results 142 may include test results over a day, a year, or ten years, for example.

Corrective action 144 includes one or more operations that may be executed to improve an operation, performance, and/or quality of a computer network. Corrective action 144 may include improving an operation, performance, and/or quality of a particular link disabling a particular link within the computer link, and/or modifying a pattern of data traffic within the computer network. Additionally or alternatively, correction action 144 may include generating an alert message to a user (such as, a network administrator).

3. Transmitting Test Traffic on a Communication Link

Figure 2:
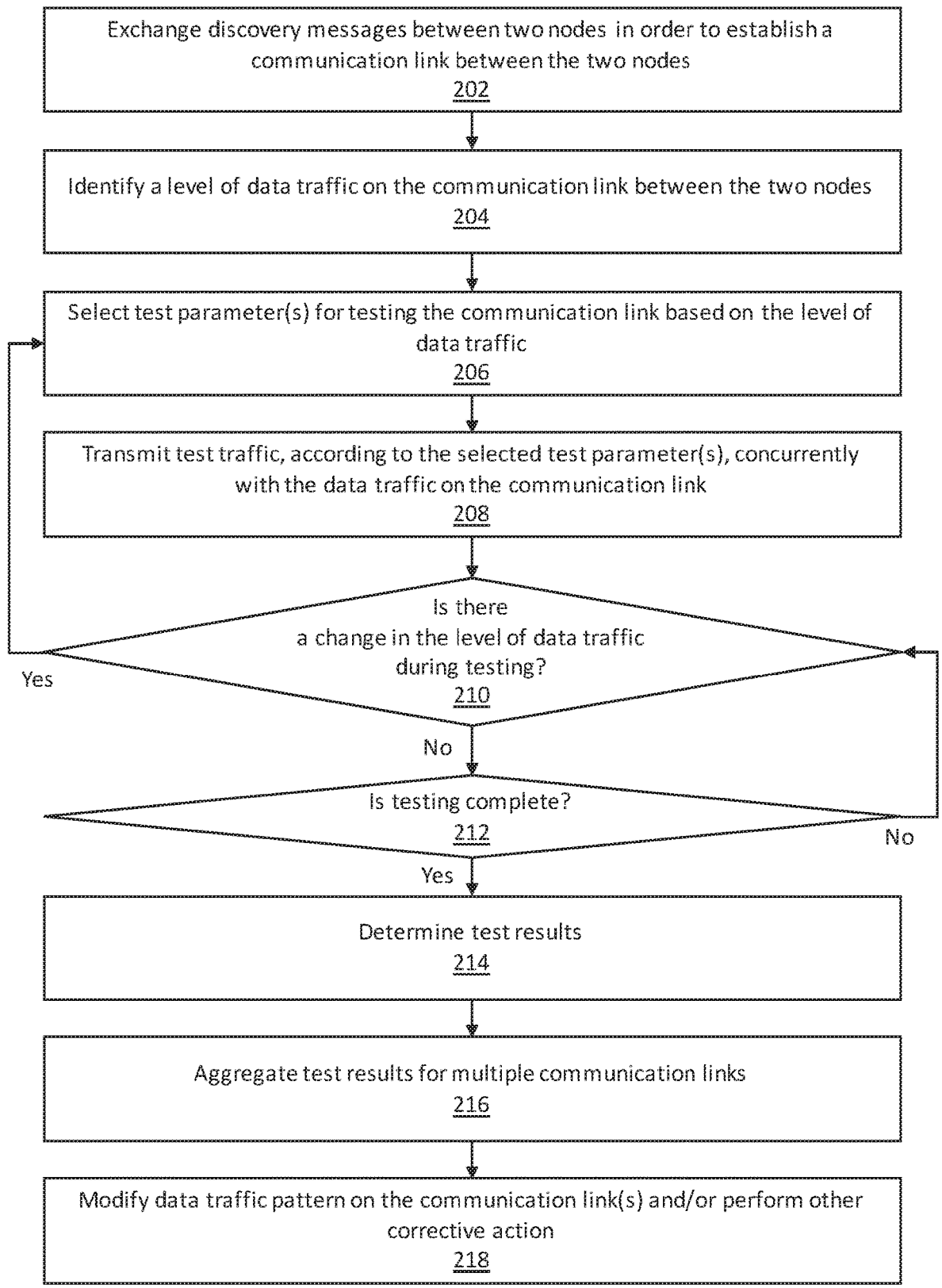
FIG. 2 illustrates an example set of operations for transmitting test traffic on a communication link, in accordance with one or more embodiments.

FIG. 2 illustrates an example set of operations for transmitting test traffic on a communication link, in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

One or more embodiments include exchanging discovery messages between two nodes in order to establish a communication link between the two nodes (Operation 202).

A particular node in a computer network (referred to herein as Node X to distinguish from other nodes described herein) transmits a discovery message. The discovery message includes an identifier of Node X. Node X may broadcast the discovery message, through each port of Node X, to any nodes connected to Node X Node X may broadcast the discovery message by addressing the discovery message to a broadcast address and/or multicast address. The broadcast address and/or multicast address may be an address of Layer 2 of the OSI model (such as, a MAC address), an address of Layer 3 of the OSI model (such as, an IP address), or any other type of identifier of a node.

Another node in the computer network (referred to herein as Node Y to distinguish from other nodes described herein) receives the discovery message from Node X. Node Y may generate a modified discovery message by appending information of Node Y to the received discovery message. The modified discovery message may include an identifier of Node X and an identifier of Node Y. Node Y may transmit and/or broadcast the modified discovery message.

Node X receives the modified discovery message. Node X determines that the modified discovery message includes both an identifier of Node X and an identifier of Node Y. Since both identifiers are included, a communication link is established between the two nodes.

In an embodiment, nodes within a computer network implement an agreed-upon protocol for exchanging discovery messages. The protocol specifies the type of information that is to be included in a discovery message and/or the format in which the information is to be included in the discovery message. As an example, a protocol may specify that a discovery message sent by a particular node is to include: (a) a name of the particular node; (b) a universally unique identifier (UUID) of the particular node; (c) an identifier of the port of the particular node that is being used to transmit the discovery message; and (d) an identifier and/or version number of the protocol. If the particular node has received a discovery message from another node within a particular time period, the particular node appends the above-listed information to the received discovery message. The particular node transmits the modified discovery message, with the appended information of the particular node. If the particular has not received a discovery message from another node within a particular time period, then the particular node generates an initial discovery message. The initial discovery message includes the information of the particular node, without including information of other nodes in the computer network.

In an embodiment, the communication link is established between the two nodes based on a peer-to-peer communication between the two nodes, without the use of a central control engine. Each node within a computer network independently transmits discovery messages. Each node may transmit the discovery message based on a cyclic schedule, an acyclic schedule, and/or an event trigger.

A cyclic schedule specifies a set frequency for transmitting discovery messages. As an example, a set schedule may be to transmit a discovery message every thirty minutes.

An acyclic schedule specifies a set of rules for transmitting discovery messages such that the frequency at which the discovery messages are sent are within a particular time range. The acyclic schedule jitters the transmission of discovery messages to prevent undesirable synchronization of the discovery messages with other data that may be transmitted through the computer network. As an example, an acyclic schedule may be to transmit a discovery message ten to fifteen minutes after transmission of the last discovery message.

An event trigger specifies one or more events that triggers transmission of a discovery message. As an example, an addition of a new node to a computer network may be an event that triggers transmission of a discovery message by an existing node of the computer network.

One or more embodiments include identifying a level of data traffic on the communication link between the two nodes (Operation 204). A test engine associated with any node within the computer network may identify the level of data traffic on the communication link connecting Node X and Node Y.

In an embodiment, a test engine associated with Node X or Node Y identifies the level of data traffic on the communication link. Either Node X or Node Y is selected as a master node. The master node is selected based on a topology of the computer network. As an example, a computer network may include Node X and Node Y. A communication link between Node X and Node Y may be established (as described above with reference to Operation 202). A topology of the computer network may include one or more default gateways. Any data entering and/or exiting the computer network must traverse at least one of the default gateways. Whether Node X or Node Y is selected as the master node in a testing of the particular link may depend on which node is "closer" to a default gateway. A minimum number of hops between Node X and any default gateway of the computer network may be M. A minimum number of hops between Node Y and any default gateway of the computer network may be N. If M is less than N, then Node X may be selected as the master node. If N is less than M, then Node Y may be selected as the master node.

A test engine associated with the master node identifies the level of data traffic by monitoring the data traffic on the communication link. The test engine may record a level of data traffic that the master node transmits to the slave node. The test engine may also record a level of data traffic that the master node receives from the slave node. The test engine may add the two levels of data traffic to obtain a total level of data traffic transmitted on the communication link.

In an embodiment, a test engine associated with a node different than Node X and Node Y identifies a level of data traffic on the communication link. The node different than Node X and Node Y (referred to herein as an "observer node") is not interconnected by the communication link established at Operation 202. The test engine may intercept the data traffic transmitted on the communication link in either direction. The test engine may determine a level of data traffic transmitted on the communication link.

The level of data traffic is an input parameter for selecting test parameters for testing the communication link. Input parameters in addition to or in lieu of the level of data traffic may be used to determine test parameters. Examples of input parameters, other than a level of data traffic, include a time of day, a link characteristic, and a type of data traffic, which are described below.

In an embodiment, the test engine determines a time of day based on a clock associated with the test engine. The test engine uses the time of day as an input parameter to determine at least one test parameter.

In an embodiment, the test engine determines a characteristic associated with the communication link. The test engine retrieves a characteristic of the communication link from a data repository. The test engine may retrieve, for example, a material of the communication link from the data repository. Additionally or alternatively, the test engine is communicatively coupled to a sensor for detecting a characteristic of the communication link. As an example, the sensor may detect a temperature of the communication link.

In an embodiment, the test engine determines a type of data traffic being transmitted on the communication link.

The type of data traffic may be determined based on metadata or other information included in the data traffic. As an example, metadata may indicate a priority level associated with the data traffic. As another example, data traffic may be analyzed to determine whether the data traffic includes audio data, video data, textual data, and/or other data.

One or more embodiments include selecting one or more test parameters for testing the communications link based on the level of data traffic (Operation 206). The test engine may select the test parameters using one or more functions and/or rules.

Figure 3:
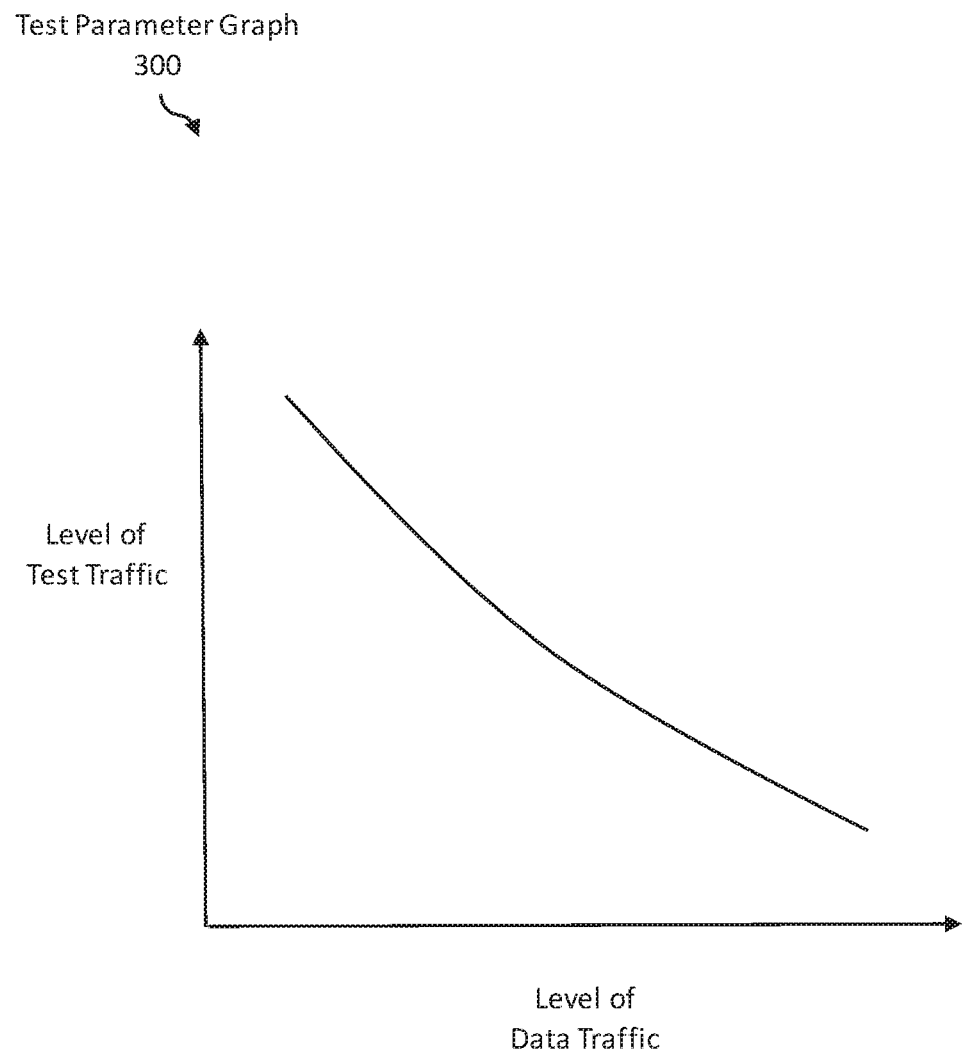
FIG. 3 illustrates an example of a test parameter graph, in accordance with one or more embodiments.

A function, implemented by the test engine, accepts one or more input parameters. The function returns one or more test parameters based on the input parameters. FIG. 3 illustrates an example of a test parameter graph 300, in accordance with one or more embodiments. Test parameter graph 300 corresponds to a particular function. As illustrated, the particular function accepts a level of data traffic as input. The particular function outputs a level of test traffic that is inversely proportional to the level of data traffic. Based on the test parameter graph 300, the lesser the level of data traffic being transmitted on a communication link, the higher the level of test traffic that may be transmitted on the communication link.

As another example, a function may accept a level of data traffic as input. The function may compute a difference value by subtracting (a) the level of data traffic from (b) a desired level of total traffic on a communication link. The difference value may be selected as a level of test traffic or as a minimum level of test traffic to he transmitted on the communication link. The combination of data traffic and test traffic would then be equal to or above the desired level of total traffic to be transmitted on the communication link. The desired level of total traffic may be designed to stress test and/or burden test the communication link.

As another example, a function may accept a priority level of the data traffic as input. The priority levels may range from "one" to "three," with "one" indicating the highest level of priority. The function may output a level of test traffic that is proportional to the priority level. The function may compute a level of test traffic that is equal to 100 Mbps for a priority level of "three." The function may compute a level of test traffic that is equal to 75 Mbps for a priority level of "two." The function may compute a level of test traffic that is equal to 0 Mbps for a priority level of "one." Based on the function, transmission of test traffic may be terminated if the data traffic is associated with the highest level of priority.

A rule specifies a mapping between input parameters and test parameters. A set of rules may be specified in any form, such as a table, an index, and/or a set of logic statements. As an example, a rule may map a current time of 9 am to a unilateral testing of a communication link. Unilateral testing involves transmitting test traffic only in one direction, from one node to another node interconnected by the communication link. Another rule may map a current time of 9 pm to a bilateral testing of the communication link. Bilateral testing involves transmitting test traffic in both directions.

In an embodiment, rules may be specified in the form of test profiles. A test profile is a type of rule that maps (a) a set of criteria to (b) a set of test parameters. As an example, a test profile may specify the following set of criteria: (a) the level of data traffic is less than 30 Mbps, and (b) the type of data traffic is not latency sensitive. The test profile may indicate that if the set of criteria is satisfied, then the following test parameters are selected: (a) the level of test traffic is 30 Mbps, and (b) the duration of testing is one hour.

Functions, rules, and/or test profiles may be used in conjunction to determine test parameters. As an example, two different functions, Function A and Function B, may accept a level of data traffic as input and return a level of test traffic as output. If a level of data traffic were 30 Mbps, for example, function A may compute a level of test traffic equal to 20 Mbps. If a level of data traffic were 30 Mbps, Function B may compute a level of test traffic equal to 10 Mbps. A set of rules may be applied to determine whether to use Function A or Function B for determining a level of test traffic. A rule may indicate that if the temperature of the optical fiber is between 51 and 100 degrees Celsius, then Function A is used. The rule may also indicate that if the temperature is between 101 and 150 degrees Celsius, then Function B is used.

In an embodiment, bilateral testing may be conducted for a communication link. The functions and/or rules used for determining the test parameters for testing in one direction may be different from the functions and/or rules used for determining the test parameters for testing in the opposite direction. As an example, Node X and Node Y may be connected to a communication link. Node X may detect that a level of data traffic on the communication link is 50 Mbps. Node X may apply a particular function for determining a level of test traffic to be transmitted from Node X to Node Y. Node X may input the 50 Mbps rate to the function. Based on the function, Node X may obtain a level of test traffic equal to 30 Mbps. Node X may transmit test traffic at 30 Mbps to Node Y. After the transmission of test traffic from Node X to Node Y, Node X may detect that a level of data traffic on the communication link remains at 50 Mbps. Node X may apply a different function for determining a level of test traffic to be transmitted from Node Y to Node X. Node X may input the 50 Mbps rate to the function. Based on the function, Node X may obtain a level of test traffic equal to 20 Mbps. Node Y may transmit test traffic at 20 Mbps to Node X.

Continuing with FIG. 2, one or more embodiments include transmitting test traffic, according to the selected test parameters, concurrently with the data traffic on the communications link (Operation 208). The master node transmits test traffic to the slave node. Additionally or alternatively, the observer node commands and/or requests one node on the communication link (such as Node X) to transmit test traffic to the other node on the communication link (such as Node Y). The test traffic is transmitted in accordance with the test parameters selected at Operation 206. As an example, a master node transmits a level of test traffic that is equal to the level of test traffic determined based on a level of data traffic.

The test traffic is transmitted concurrently with the data traffic on the communication link. As a particular node transmits test traffic to another node, the particular node also transmits data traffic to the other node. The data traffic and test traffic may or may not be transmitted via the same ports of the nodes. As an example, Node X may include Port A and Port B. Node Y may include Port C and Port D. In one scenario, data traffic and test traffic may be concurrently transmitted from Port A of Node X to Port C of Node Y. In another scenario, data traffic may be transmitted from Port A of Node X to Port C of Node Y At the same time, test traffic may be transmitted from Port B of Node X to Port D) of Node Y.

A particular node may be associated with a single identifier or multiple identifiers. As an example, the same identifier may be used for data traffic transmissions and test traffic transmissions. As another example, different identifiers may be used for data traffic transmissions and test traffic transmissions, respectively. One identifier is used for transmitting and/or receiving data traffic. The other identifier is used for transmitting and/or receiving test traffic. The two identifiers may be, for example, two different addresses of Layer 2 of the OSI model (such as, MAC addresses). Alternatively, the two identifiers may be two different addresses of Layer 3 of the OSI model (such as, IP addresses). Alternatively, the two identifiers may include different port numbers.

In an embodiment, a particular link may be associated with a maximum bandwidth and/or capacity. Test traffic and/or data traffic to be transmitted on the particular link may exceed the maximum bandwidth and/or capacity. Test traffic and/or data traffic may be placed on a queue while waiting for sufficient bandwidth and/or capacity. The queue may include any traffic to be transmitted via any port of the particular link. Alternatively, the queue may be specific to a particular port of the particular link. The queue may include only traffic to be transmitted via the particular port.

A transmission rate of one or more items on the queue may be reduced such that transmission of the items on the particular link does not exceed the maximum bandwidth and/or capacity. Items in the queue may be concurrently transmitted at the reduced transmission rates. As an example, a queue corresponding to a particular link may include (a) test traffic to be transmitted at 50 Mbps, and (b) data traffic to be transmitted at 70 Mbps. A maximum transmission rate supported by the particular link may be 100 Mbps. If the test traffic and the data traffic were transmitted concurrently, the total transmission rate would be 120 Mbps. In order to not exceed the maximum transmission rate supported by the particular link, the transmission rate of the test traffic may be reduced. The transmission rate of the test traffic may be reduced to 30 Mbps. The test traffic and the data traffic may be concurrently transmitted on the particular link at a 30 Mbps transmission rate and a 70 Mbps transmission rate, respectively.

The transmission rate of a particular item may be reduced based on a priority level associated with the particular item. As an example, data traffic may be classified as high priority, while test traffic may be classified as low priority. A queue corresponding to a particular link may include (a) test traffic initially configured for transmission at 50 Mbps, and (b) data traffic initially configured for transmission at 80 Mbps. However, a maximum transmission rate supported by the particular link may be 100 Mbps. The transmission rate of the test traffic may be reduced to 30 Mbps (a reduction of 20 Mbps, or 40%). The transmission rate of the data traffic may be reduced to 70 Mbps (a reduction of 10 Mbps, or 12.5%). The test traffic and the data traffic may be concurrently transmitted on the particular link at a 30 Mbps transmission rate and a 70 Mbps transmission rate, respectively. This example illustrates that a level of reduction in a transmission rate of a high-priority item may be less than a level of reduction in a transmission rate of a low-priority item.

In an embodiment, transmission of test traffic for testing a particular link is initiated by a node connected to the particular link (Node X or Node Y), without the use of a central control engine. The transmission of test traffic may follow after exchanging discovery messages to establish a communication link at Operation 202. Alternatively, the transmission of test traffic may be based on a cyclic schedule, an acyclic schedule, and/or an event trigger, that is different than that associated with exchanging discovery messages.

As an example, nodes of a computer system may transmit discovery messages based on a cyclic schedule. The nodes may transmit discovery messages once every twelve hours. Based on the most recent exchange of discovery messages, communication links may be established. A master node may be identified for each communication link. Each master node may transmit test traffic based on a different cyclic schedule. One master node may transmit test traffic for testing a communication link once every two hours. Another master node may transmit test traffic for testing another communication link once every three hours.

The following illustrates an example of an acyclic schedule for transmitting test traffic. A master node may be connected to three slave nodes, each through a different communication link. The three communication links are referred to herein as Links 1-3. Testing of Links 1-3 may include transmitting test traffic sequentially on each of the three communication links. The duration of the testing on each communication link may be two minutes. An acyclic schedule may provide that testing of Links 1-3 be conducted once per hour. The acyclic schedule may further provide that within each hourly testing of Links 1-3, the sequence in which each of communication links are tested is randomized. Based on the acyclic schedule, each communication link would be tested every 56-64 minutes.

Below is an example timeline of the transmission of test traffic according to the above acyclic schedule:

At 9:00 a.m., the master node may transmit test traffic on Link 1;
At 9:02 a.m., the master node may transmit test traffic on Link 3;
At 9:04 a.m., the master node may transmit test traffic on Link 2;
At 10:00 a.m., the master node may transmit test traffic on Link 2;
At 10:02 a.m., the master node may transmit test traffic on Link 1;
At 10:04 a.m., the master node may transmit test traffic on Link 3.

In an embodiment, the transmission of test traffic may be optionally conditioned upon acknowledgement and/or acceptance by the node receiving the test traffic. Prior to transmitting test traffic, the master node (or any node that initiates transmission of test traffic) transmits a test notification and/or request to the slave node (or any node that receives test traffic). The test notification and/or request includes the test parameters selected at Operation 206. The slave node responds with an acknowledgement and/or acceptance. If the master node does not receive the acknowledgement and/or acceptance, then testing does not begin. Additionally or alternatively, the slave node may respond with a test parameter that is different than the test parameters selected at Operation 206. The slave node may attempt to negotiate conducting the test with the different test parameter, such as a lower level of test traffic.

In an embodiment, nodes within a computer network implement an agreed-upon protocol for transmitting test traffic. The protocol may be the same as the protocol for exchanging discovery messages, which is described above with reference to Operation 202. The protocol provides that a master node (or any node initiating a test) is to transmit a test notification and/or request. The protocol specifies the type of information to be included in the test notification and/or request, such as the test parameters selected at Operation 206. The protocol provides that a slave node (or any node receiving the test notification and/or request) is to respond with an acknowledgement and/or acceptance. The protocol may provide the slave node with an option to negotiate different test parameters with the master node.

In an embodiment, prior to the transmission of test traffic on the communication link, a particular level of data traffic may be transmitted on the communication link. The test engine may shift a portion of the data traffic to another communication link. As an example, data traffic at 50 Mbps may be transmitted on Link X. Prior to transmitting test traffic on Link X, the data traffic originally transmitted on Link X may be distributed to two links. Data traffic at 30 Mbps may continue to be transmitted on Link X. At the same time, data traffic at 20 Mbps may be distributed for transmission at Link Y. Transmission of test traffic on Link X may begin. The data traffic at 30 Mbps may be transmitted concurrently with the test traffic on Link X.

One or more embodiments include determining whether there is a change in the level of data traffic during testing (Operation 210). The test engine may detect a change in the level of data traffic. Any node within the computer network, such as, the master node, the observer node, and/or the slave node, may detect a change in the level of the data traffic. The change in the level of the data traffic may be, for example, a sudden increase in data traffic caused by an end-user application executed by a node of the computer network.

If there is a change in the level of data traffic, then test parameters are re-selected based on the current level of data traffic, in accordance with Operation 206. Hence, the test parameters used for testing a link are modified based on a change in the level of data traffic. The master node, observer node, and/or slave node (or a test engine associated with the master node, observer node, and/or slave node) may perform the operation of re-selecting the test parameters based on the current level of data traffic.

If the master node and/or observer node detects the change in the level of data traffic, then the master node and/or observer node may select the test parameters based on the current level of data traffic.

Additionally or alternatively, if the slave node detects the change in the level of data traffic, then the slave node may transmit a message to the master node and/or observer node. The message may indicate that there is a change in the level of data traffic, and/or an amount of change in the level of data traffic. The master node and/or observer node may select the test parameters based on the current level of data traffic detected by the slave node.

Additionally or alternatively, if the slave node detects the change in the level of data traffic, then the slave node may select the test parameters based on the current level of data traffic. The slave node may transmit a message to the master node and/or observer node. The message may include a request and/or command to modify the test parameters based on the selection by the slave node. As an example, a master node may request to transmit test traffic at 100 Mbps to a slave node. The slave node may select a level of test traffic based on a change in the level of data traffic. The selected level of test traffic may be 50 Mbps. The slave node may transmit a request, to the master node, to modify the level of test traffic from 100 Mbps to 50 Mbps. As another example, a slave node may detect that a current level of data traffic exceeds a threshold value. Since the threshold value is exceeded, the slave node may transmit a command, to the master node, to stop the transmission of test traffic.

One or more embodiments include determining whether testing is complete (Operation 212). Testing includes transmitting test traffic and receiving test feedback. A particular node receiving test traffic (such as, a slave node) generates and transmits test feedback based on the received test traffic. The test feedback may be transmitted to the node that initially transmitted the test traffic (such as, a master node). The master node receives the test feedback.

In an embodiment, the test feedback includes a checksum, such as an IP header checksum, and/or a frame check sequence (FCS). The slave node receives the test traffic. The slave node determines the checksum corresponding to the received test traffic. The slave node transmits the checksum to the master node.

Additionally or alternatively, the test feedback includes a full copy of the received test traffic. The slave node receives the test traffic. The slave node transmits a full copy of the received test traffic to the master node.

Additionally or alternatively, the test feedback includes characteristics of the received test traffic such as a number of bits, bytes, frames, and/or packets corresponding to the received test traffic. The slave node receives the test traffic. The slave node determines the number of bits, bytes, frames, and/or packets corresponding to the received test traffic. The slave node transmits information indicating the number of bits, bytes, frames, and/or packets corresponding to the received test traffic. The slave node transmits the information to the master node.

Additionally or alternatively, the test feedback includes a number of frames and/or packets that are received with errors. The slave node receives the test traffic. A particular number of received frames and/or packets include an error. The slave node transmits information indicating a number of received frames and/or packets with errors. The slave node transmits the information to the master node. Similarly, the slave node may transmit information indicating a number of received frames and/or packets without errors.

Additionally or alternatively, the test feedback includes a time period during which the test traffic was received. The slave node begins to receive test traffic at a particular start time. The slave node stops receiving test traffic at a particular end time. The slave node records the particular start time and the particular end time. The slave node transmits information indicating the particular start time, the particular end time, and/or a duration between the particular start time and the particular end time. The slave node transmits the information to the master node.

While testing remains incomplete, the level of data traffic continues to be monitored, in accordance with Operation 210. If a change in the level of data traffic is detected during testing, then test parameters may be modified.

In one or more embodiment, testing of the communication link may include unilateral testing or bilateral testing. Whether unilateral testing or bilateral testing is being conducted may be determined as part of the selection of test parameters at Operation 206. In unilateral testing, testing is complete after:
  (a) transmitting test traffic from the master node to the slave node; and
  (b) transmitting test feedback from the slave node to the master node based on the test traffic.

In contrast, in bilateral testing, testing is complete after:
  (a) transmitting an initial set of test traffic from the master node to the slave node;
  (b) transmitting an initial set of test feedback from the slave node to the master node based on the initial set of test traffic;
  (c) transmitting a secondary set of test traffic from the slave node to the master node; and
  (d) transmitting a secondary set of test feedback from the master node to the stave node based on the secondary set of test traffic.

One or more embodiments include determining test results (Operation 214). The node that transmitted the test traffic (such as, a master node) receives the test feedback. Additionally or alternatively, the test engine receives the test feedback. Test results are generated based on the test feedback. The test results may indicate an operability and/or performance of the communication link. Additionally or alternatively, the test results may indicate whether the communication link passes or fails the testing. If bilateral testing is conducted, then test results for each direction are determined.

In an embodiment, the test engine receives test feedback including a checksum corresponding to the test traffic that was received by the slave node. The test engine determines a checksum corresponding to the test traffic that was transmitted by the master node. The test engine compares the two checksums. If the two checksums are different, then the communication link may be deemed inoperable.

Additionally or alternatively, the test engine receives test feedback including a full copy of the test traffic received by the slave node. The test engine identifies any differences between (a) the full copy of the test traffic received by the slave node, and (b) the test traffic that was transmitted by the master node. The test engine may determine a number of differences and/or a percentage of differences between the two versions of test traffic. Based on the differences, a performance rating of the communication link may be determined. As an example, if a percentage of differences between the two versions of test traffic is between 0% and 5%, then a performance rating of the communication link may be "Excellent." If a percentage of differences between the two versions of test traffic is between 5% and 15%, then a performance rating of the communication link may be "Good."

Additionally or alternatively, the test engine receives test feedback including a number of bits, bytes, frames, and/or packets corresponding to the test traffic received by the slave node. The test engine determines a number of bits, bytes, frames, and/or packets corresponding to the test traffic transmitted by the master node. The test engine computes a difference between (a) the number of bits, bytes, frames, and/or packets corresponding to the test traffic received by the slave node, and (b) the number of bits, bytes, frames, and/or packets corresponding to the test traffic transmitted by the master node. Based on the difference, a performance rating of the communication link may be determined. As an example, if the difference is greater than a particular threshold value, then the communication link may be deemed inoperable.

Additionally or alternatively, the test engine receives test feedback including a number of frames and/or packets of test traffic that are received with errors by the slave node. The test engine determines a number of frames and/or packets corresponding to the test traffic transmitted by the master node. The test engine determines an error rate. As an example, an error rate may be a ratio of: (a) a number of frames and/or packets received with errors by the slave node, to (b) a number of frames and/or packets transmitted by the master node. Based on the error rate, a performance rating of the communication link may be determined.

Additionally or alternatively, the test engine receives test feedback including a time period during which the test traffic was received by the slave node. The test engine determines a particular start time at which the master node began transmitting the test traffic. The test engine determines a particular end time at which the master node stopped transmitting the test traffic. The test engine compares (a) the time period during which the test traffic was received by the slave node and (b) the time period during which the test traffic was transmitted by the master node. The test engine may determine a difference in the two start times, and/or a difference in the two end times. The test engine may determine a difference between (a) a duration of the time period in which the slave node received the test traffic and (b) a duration of the time period in which the master node transmitted the test traffic. Based on the differences in the time periods, a performance rating of the communication link may be determined.

Different sets of test results may correspond to transmissions during different periods with different respective total traffic levels. As an example, during a first time period, the total traffic (test traffic and data traffic) may be transmitted at a rate of 50 Mbps. A first set of test results may be determined based on test feedback corresponding to the test traffic transmitted during the first period of time. During a second time period, the total traffic (test traffic and data traffic) may be transmitted at a rate of 150 Mbps. A second set of test results may be determined based on test feedback corresponding to the test traffic transmitted during the second period of time.

One or more embodiments optionally include aggregating test results from multiple communication links (Operation 216). The test engine transmits the test results to a link management engine. Additional test engines associated with other nodes within the computer network may also transmit test results to the link management engine. Each test result indicates the operability and/or performance of a particular link in a particular direction. The link management engine aggregates the test results for the multiple links into a set of aggregated test results.

One or more embodiments include modifying a pattern of data traffic on one or more communication links and/or performing other corrective action (Operation 218). The test engine may determine the corrective action based on the test results for a single communication link. Additionally or alternatively, the link management engine may determine the corrective action based on the aggregated test results for multiple communication links.

In an embodiment, the test results indicate a performance rating associated with a particular link. If the performance rating is below a threshold value, the test engine and/or link management engine disables the particular link. The test engine and/or link management engine transfers all data traffic originally transmitted on the particular link to another link within the computer network. Additionally or alternatively, if the performance rating is below a threshold value, the test engine and/or link management engine generates an error message. The error message may be presented to a user (such as, a network administrator) via a user interface.

In an embodiment, the link management engine performs load balancing to distribute data traffic on the links within a computer network. The link management engine applies a weight to each link based on the test results corresponding to the link. A greater weight may be applied to a link with a higher performance rating than to a link with a lower performance rating. During load balancing, the link management engine may distribute a greater level of data traffic to communication links with greater weights than to communication links with lesser weights.

As an example, a computer network, including Link 1 and Link 2, may need to support a data traffic throughput of 500 Mbps. Aggregated test results may indicate that Link 1 is rated as "Excellent" and Link 2 is rated as "Acceptable." Based on the aggregated test results, a heavier weight may be assigned to Link 1 than to Link 2. Based on the different weights, load balancing across the links would result in different levels of data traffic assigned to each link. A link management engine may assign a level of data traffic to Link 1 that is greater than a level of data traffic assigned to Link 2. For example, data traffic at 350 Mbps may be assigned to Link 1, while data traffic at 150 Mbps may be assigned to Link 2.

In an embodiment, the link management engine may detect a topology corresponding to the computer network based on the aggregated test results. The link management engine may compare the detected topology against an expected topology for the computer network. The link management engine may generate an error message if there are any differences between the detected topology and the expected topology.

As an example, the aggregated test results may include a particular set of test results for a communication link between Node X and Node Y. Based on the aggregated test results, a link management engine may detect a topology of the computer network. The detected topology may include a communication link between Node X and Node Y. The link management engine may retrieve an expected topology of the computer network from a data repository. The expected topology may indicate that Node X and Node Y are not interconnected. The link management engine may generate an error message, indicating the difference between the detected topology and the expected topology.

In an embodiment, the test engine and/or the link management engine performs trend analysis on the test results and/or aggregated test results obtained over a particular time period. A performance of a particular link may deteriorate over the particular time period. If the rate at which the performance is deteriorating exceeds a threshold value, then an error message is generated.

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

FIGS. 4A-4F illustrate an example of transmitting test traffic on a communication link, in accordance with one or more embodiments. As illustrated, FIGS. 4A-4F include a computer network including nodes 400, 410, 420, and 430. Node 400 is associated with ports 402-409. Node 410 is associated with ports 412-418. Node 420 is associated with ports 422-428. Node 430 is associated with ports 432-438. Additional nodes may also be included in the computer network.

Figure 4A:
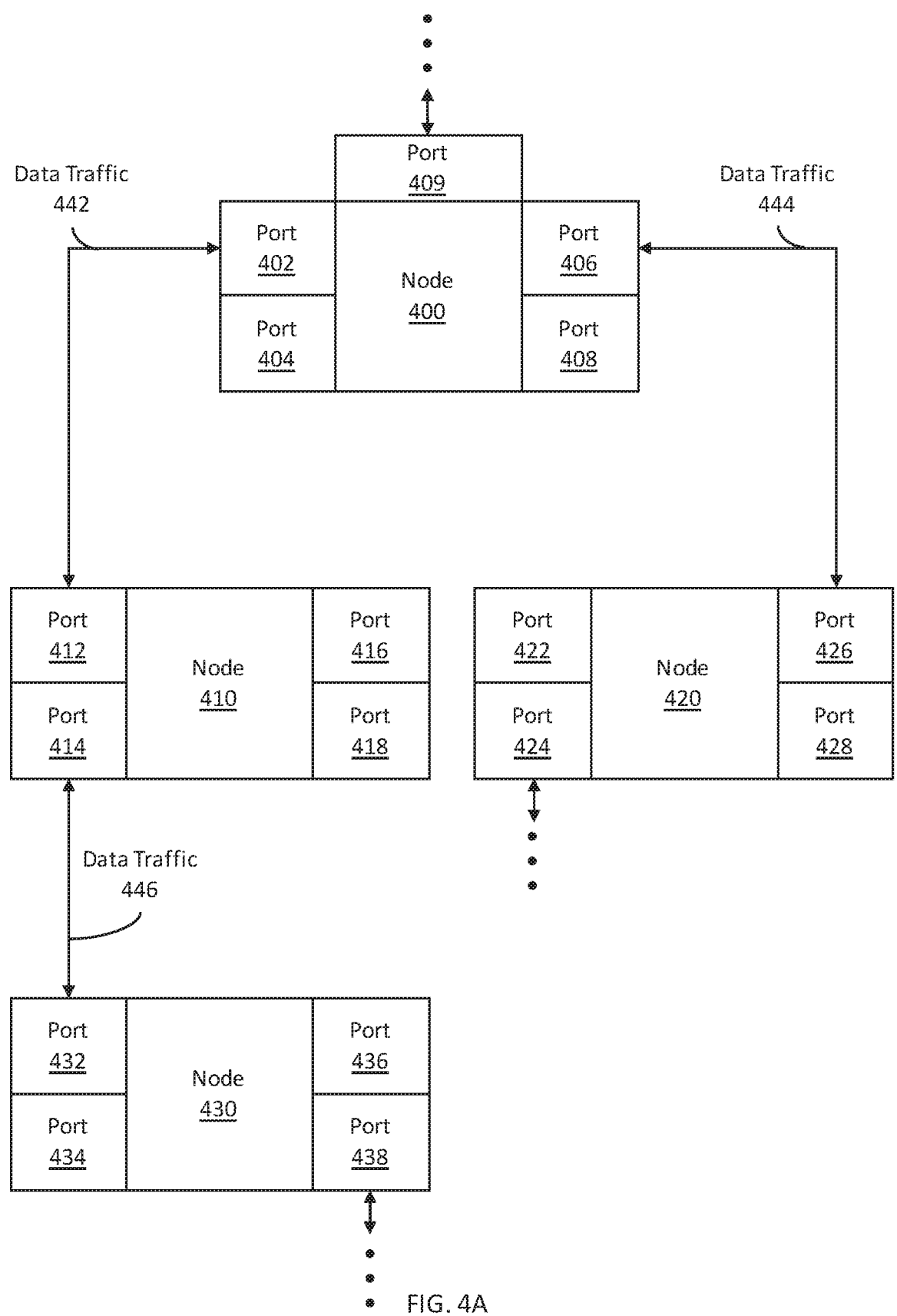
FIGS. 4A-4F illustrate an example of transmitting test traffic on a communication link, in accordance with one or more embodiments.

Referring to FIG. 4A, initially, data traffic 442 is transmitted between port 402 of node 400 and port 412 of node 410. Data traffic 444 is transmitted between port 406 of node 400 and port 426 of node 420. Data traffic 446 is transmitted between port 414 of node 410 and port 432 of node 430.

Figure 4B:
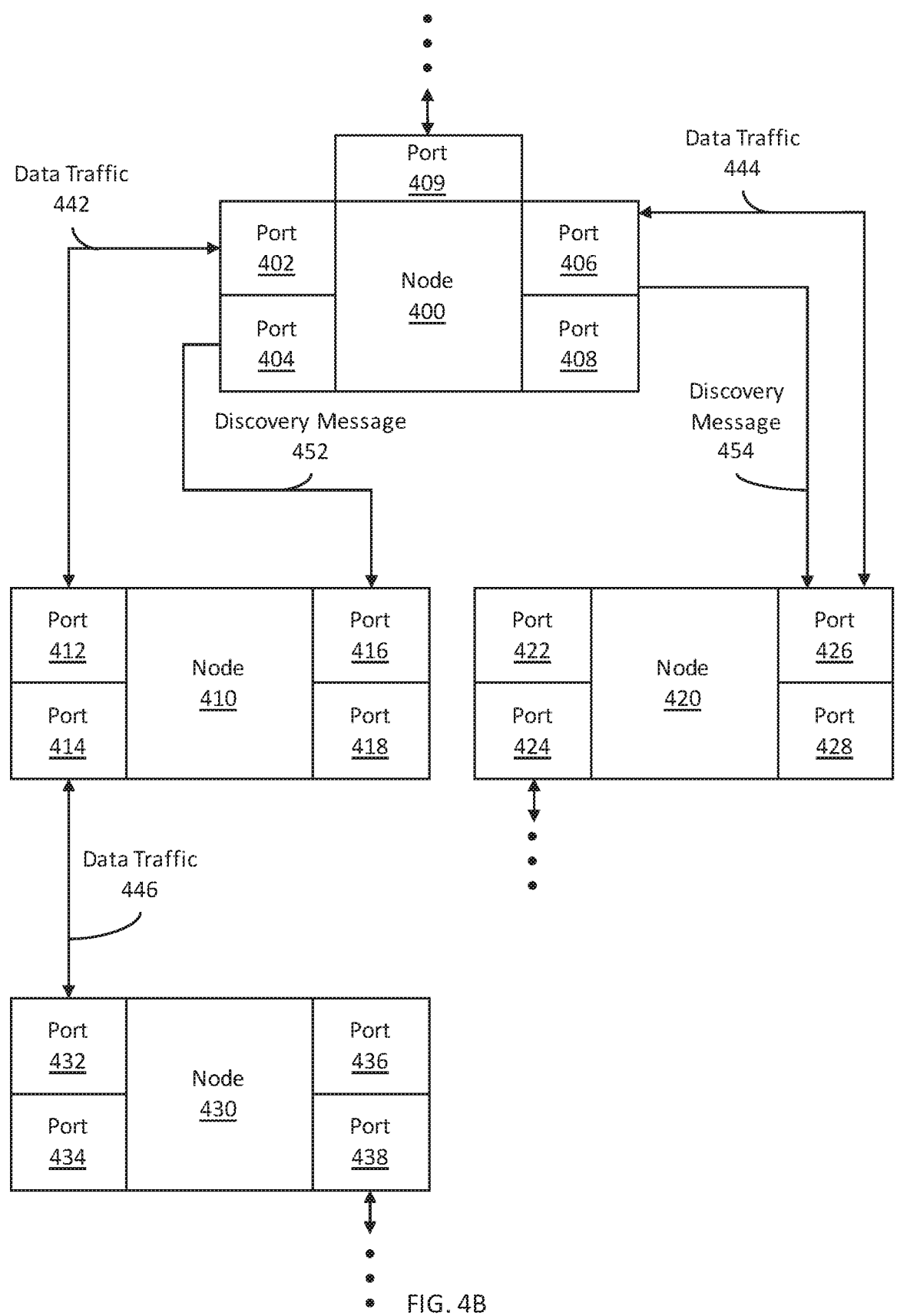

Referring to FIG. 4B, node 400 transmits discovery messages to establish communication links. Node 400 transmits discovery message 452 via port 404. At the same time, data traffic 442 continues to be transmitted between port 402 and port 412. Node 410 receives discovery message 452 via port 416.

Further, node 400 transmits discovery message 454 via port 406. Discovery message 454 is transmitted concurrently with data traffic 444 via port 406. Node 420 receives discovery message 424 and data traffic 444 via port 426.

Discovery messages 452 and 454 conform to a protocol implemented by the nodes of the computer network. The protocol specifies that a discovery message should include an identifier of the node transmitting the discovery message. Discovery message 452 includes an identifier of node 400. Discovery message 454 includes an identifier of node 400.

Figure 4C:
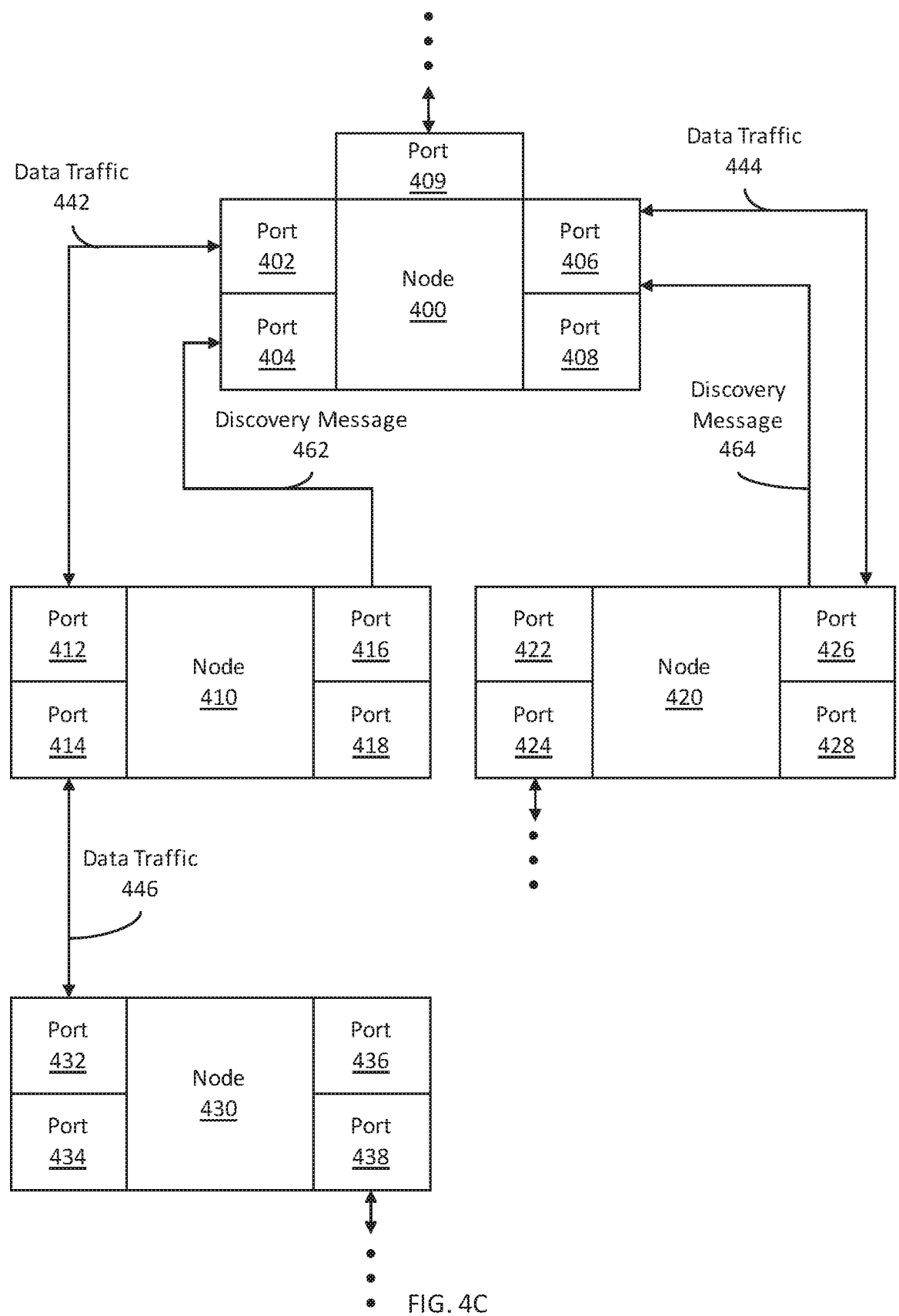

Referring to FIG. 4C, node 410 receives discovery message 452. Node 410 appends an identifier of node 410 to discovery message 452 to generate discovery message 462. Hence, discovery message 462 includes both an identifier of node 400 and an identifier of node 410. Node 410 transmits discovery message 462 via port 416. At the same time, data traffic 442 continues to be transmitted between port 402 and port 412.

Node 400 receives discovery message 454 via port 404. Node 400 determines that discovery message 454 includes both an identifier of node 400 and an identifier of node 410. Based on discovery message 454, node 400 determines that a communication link is established between node 400 and node 410.

Node 420 receives discovery message 454. Node 420 appends an identifier of node 420 to discovery message 454 to generate discovery message 464. Hence, discovery message 464 includes both an identifier of node 400 and an identifier of node 420. Node 420 transmits discovery message 464 via port 426. Discovery message 464 is transmitted concurrently with data traffic 444 via port 426.

Node 400 receives discovery message 464 via port 406. Node 400 determines that discovery message 464 includes both an identifier of node 400 and an identifier of node 420. Based on discovery message 464, node 400 determines that a communication link is established between node 400 and node 420.

Node 400 does not receive any discovery messages including both an identifier of node 400 and an identifier of node 430. Hence, no communication link is established between node 400 and node 430.

Figure 4D:
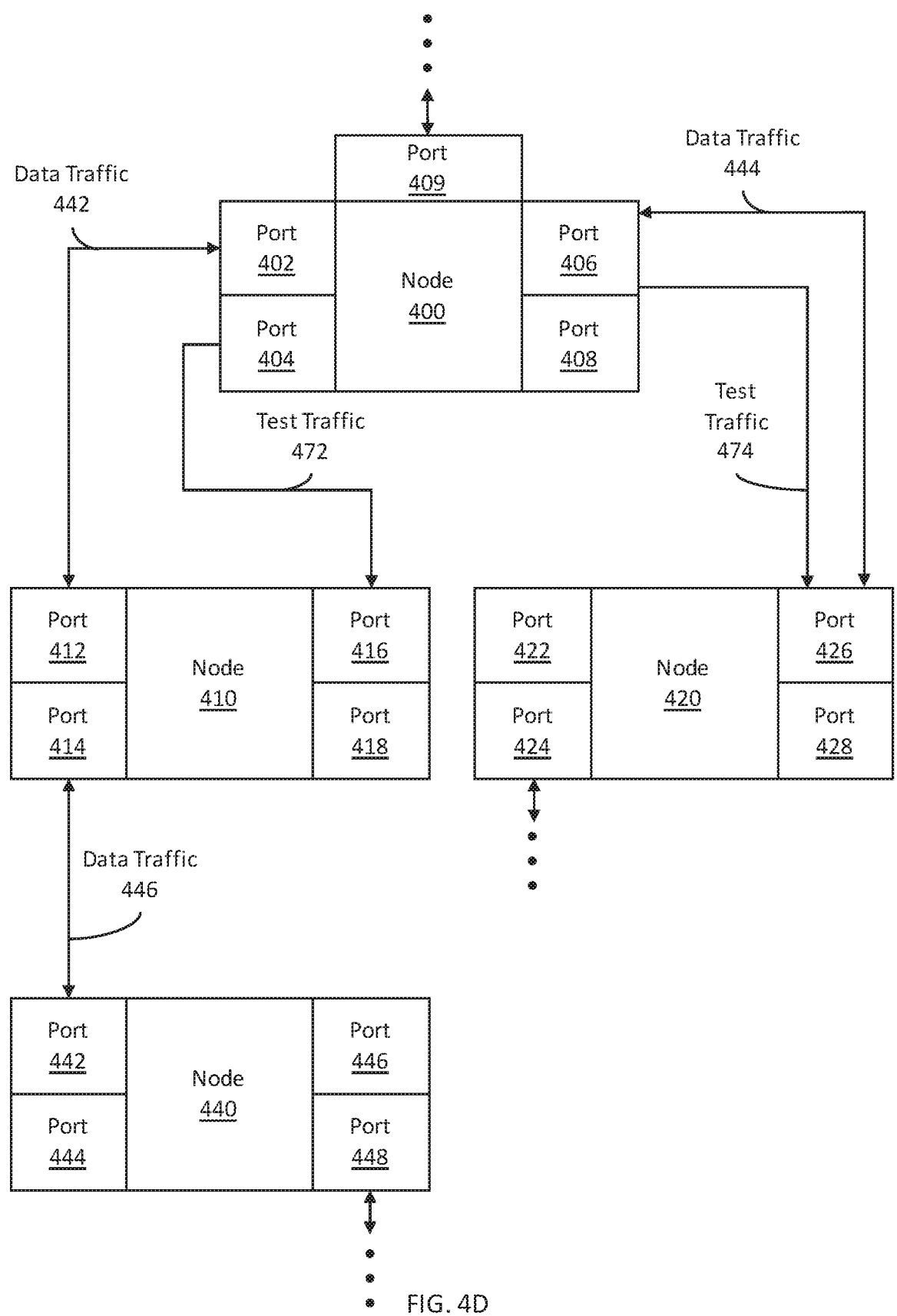

Referring to FIG. 4D, a master node is selected for each established communication link. The master node is selected based on a topology of the computer network. The computer network includes a default gateway for routing data in and out of the computer network. Node 400 is, for example, four hops away from the default gateway. Node 410 is five hops away from the default gateway. Node 420 is five hops away from the default gateway. Since node 400 is closer to the default gateway than node 410 and node 420, node 400 is selected as the master node.

A test engine associated with node 400 identifies a level of data traffic transmitted on each communication link. The test engine identifies a level of data traffic 442. The test engine inputs the level of data traffic 442 into a particular function. Based on the function, the test engine determines a set of test parameters, including a particular level of test traffic 472. The test engine transmits the particular level of test traffic 472 via port 404 of node 400. Node 410 receives test traffic 472 via port 416.

Test traffic 472 is transmitted concurrently with data traffic 442 on the communication link connecting node 400 and node 410. Test traffic 472 is addressed to one identifier of node 410, while data traffic 442 is addressed to another identifier of node 410.

The test engine identifies a level of data traffic 444. The test engine inputs the level of data traffic 444 into a particular function. Based on the function, the test engine determines a set of test parameters, including a particular level of test traffic 474. The test engine transmits the particular level of test traffic 474 via port 406 of node 400. Node 410 receives test traffic 474 via port 426.

Test traffic 474 is transmitted concurrently with data traffic 444 on the communication link connecting node 400 and node 420. Test traffic 474 and data traffic 444 are addressed to a same identifier of node 420.

Figure 4E:
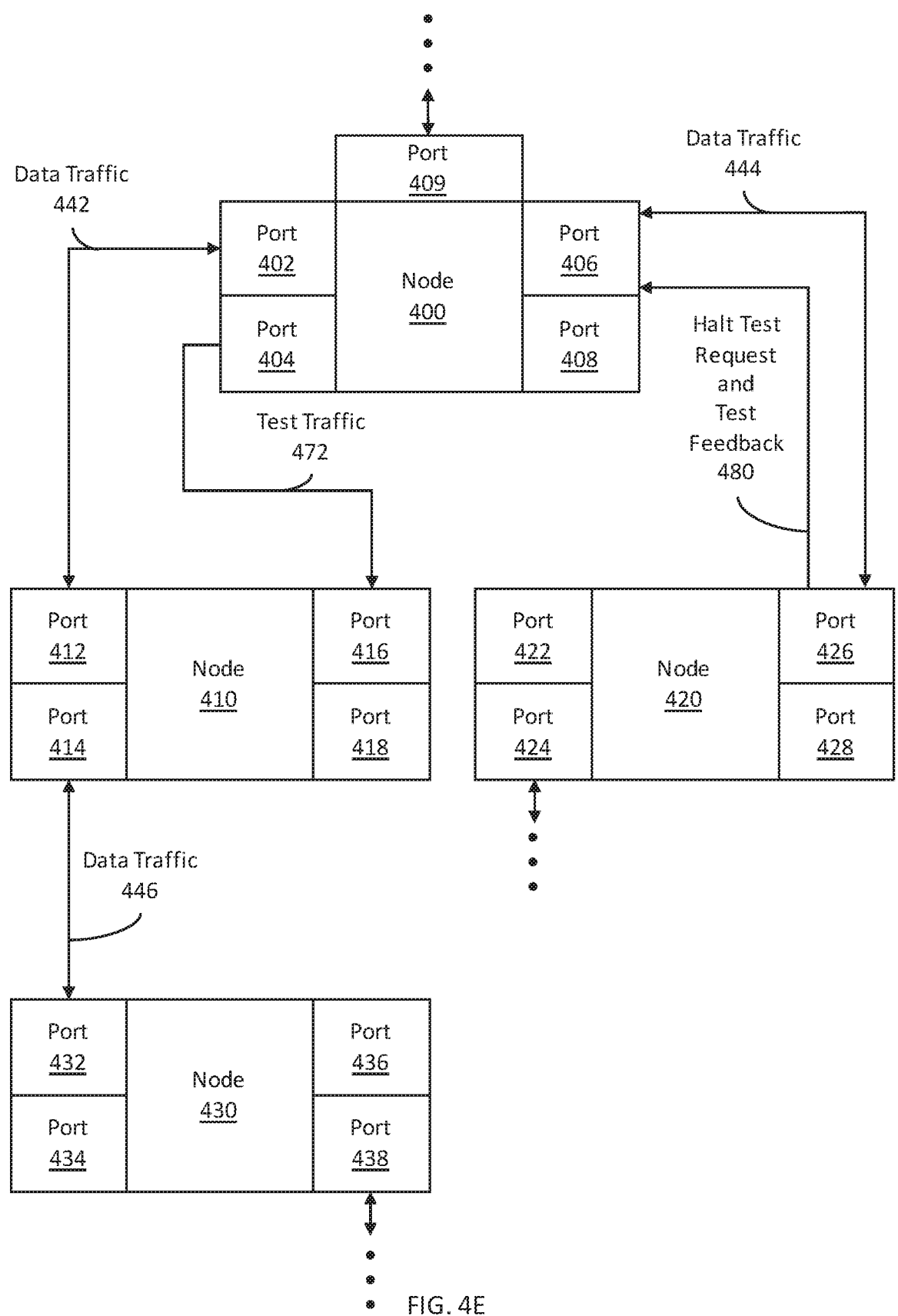

Referring to FIG. 4E, during the transmission of test traffic 472, node 410 monitors a level of data traffic 442. Node 410 determines that there is no change to the level of data traffic 442. Node 400 continues to transmit the particular level of test traffic 472 to node 410.

During the transmission of test traffic 474, node 420 monitors a level of data traffic 444. Node 420 determines that there is a sudden spike in the level of data traffic 444. As an example, a particular application executed by a node of the computer network may initiate a synchronization process. The synchronization process includes transmitting a particular level of data traffic between node 400 and node 420. The addition of the particular level of data traffic to the existing data traffic causes the sudden spike in the level of data traffic 444. Node 420 determines that the increase in the level of data traffic 444 is above a threshold value.

Since the increase in the level of data traffic 444 is above the threshold value, node 420 transmits halt test request and test feedback 480. Node 420 transmits halt test request and test feedback 480 via port 426. The halt test request is a request for node 400 to stop the transmission of test traffic 474. Based on the halt test request, the test parameters for testing the communication link between node 400 and node 420 are modified. Specifically, the level of test traffic 474 is set to zero (0).

The test feedback corresponds to test traffic 474 that has been received by node 420 prior to the transmission of the halt test request. The test feedback includes a full copy of test traffic 474 that has been received.

Node 400 receives halt test request and test feedback 480 via port 406. Node 400 compares (a) the full copy of test traffic 474 received by node 420 and (b) test traffic 474 transmitted by node 400. Node 400 determines that the two versions of test traffic 474 are the same. The test engine associated with node 400 generates test results for the communication link between node 400 and node 420 based on the partial testing of the communication link. The test results indicate the communication link is operable.

Figure 4F:
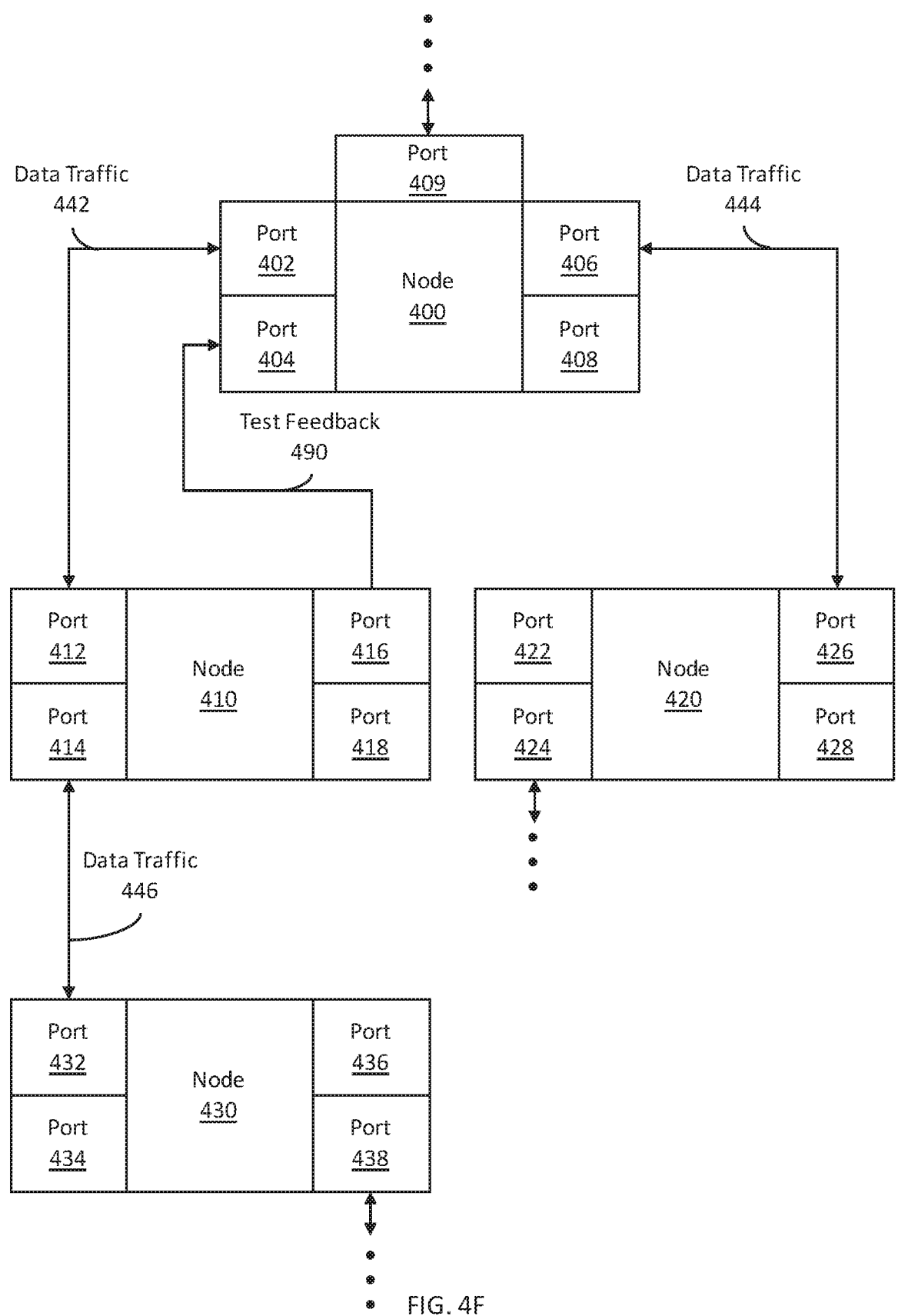

Referring to FIG. 4F, node 400 completes the transmission of test traffic 472 to node 410, Node 410 transmits test feedback 490 via port 416. Test feedback 490 includes a checksum corresponding to test traffic 472 received by node 410. At the same time, data traffic 442 continues to be transmitted between port 402 and port 412, Node 400 receives test feedback 490 via port 404. Node 400 determines a checksum corresponding to test traffic 472 transmitted by node 400. Node 400 compares (a) the checksum corresponding to test traffic 472 received by node 410, and (b) the checksum corresponding to test traffic 472 transmitted by node 400. Node 400 determines that the two checksums are different. The test engine associated with node 400 generates test results for the communication link between node 400 and node 410. The test results indicate that the communication link fails the testing.

Node 400 determines a corrective action based on the test results for the communication link between node 400 and node 410 and the test results for the communication link between node 400 and node 420. Since the communication link between node 400 and node 410 failed the testing, node 400 disables this communication link. Node 400 transfers data traffic 442 from the communication link between node 400 and node 410 to the communication link between node 400 and node 420. Both data traffic 442 and data traffic 444 are transmitted on the communication link between node 400 and node 420.

5. Cloud Computing Networks

In one or more embodiments, a cloud computing network provides a pool of resources that are shared amongst multiple client devices. Examples of resources include a processor, server, data storage, virtual machine (VM), platform, and/or software application. The pool of resources may be geographically centralized and/or distributed. As an example, the pool of resources may be located at one or more datacenters. Client devices may independently request computing services, such as server time and network storage, as needed. The resources may be dynamically assigned to the requests and/or client devices on an on-demand basis. The resources assigned to each particular client device may be scaled up or down based on the computing services requested by the particular client device. The resources assigned to each particular client device may also be scaled up or down based on the aggregated demand for computing services requested by all client devices.

In an embodiment, the resources of a cloud environment are accessible over a network, such as a private network or the Internet. One or more physical and/or virtual client devices demanding use of the resources may be local to or remote from the resources. The client devices may be any type of computing devices, such as computers or smartphones, executing any type of operating system. The client devices communicate requests to the resources using a communications protocol, such as Hypertext Transfer Protocol (HTTP). The requests are communicated to the resources through an interface, such as a client interface (such as a web browser), a program interface, or an application programming interface (API).

In an embodiment, a cloud service provider provides a cloud environment to one or more cloud users. Various service models may be implemented by the cloud environment, including but not limited to Software-as-a-Service (SaaS), Platform-as-a-Service (PaaS), and Infrastructure-as-a-Service (IaaS). In SaaS, a cloud service provider provides cloud users the capability to use the cloud service provider's applications, which are executing on the cloud resources. In PaaS, the cloud service provider provides cloud users the capability to deploy onto the cloud resources custom applications, which are created using programming languages, libraries, services, and tools supported by the cloud service provider. In IaaS, the cloud service provider provides cloud users the capability to provision processing, storage, networks, and other fundamental computing resources provided in the cloud environment. Any arbitrary applications, including an operating system, may be deployed on the cloud resources.

In an embodiment, various deployment models may be implemented by a cloud environment, including but not limited to a private cloud, a public cloud, and a hybrid cloud. In a private cloud, cloud resources are provisioned for exclusive use by a particular group of one or more entities (the term "entity" as used herein refers to a corporation, organization, person, or other entity). The cloud resources may be located on the premises of one or more entities in the particular group, and/or at one or more remote off-premise locations. In a public cloud, cloud resources are provisioned for multiple entities (also referred to herein as "tenants" or "customers"). Each tenant is associated with one or more client devices for accessing the cloud resources. Several tenants may use a same particular resource, such as a server, at different times and/or at the same time. The cloud resources may be located at one or more remote off-premise locations, away from the premises of the tenants. In a hybrid cloud, the cloud environment comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, in a multi-tenant cloud computing network, each tenant may be independent from other tenants. For example, a business or operation of one tenant may be separate from a business or operation of another tenant. Each tenant may require different levels of computing services to be provided by the cloud computing network. Tenant requirements may include, for example, processing speed, amount of data storage, level of security, and/or level of resiliency.

In an embodiment, in a multi-tenant cloud computing network, tenant isolation is implemented. Each tenant corresponds to a unique tenant identifiers (IDs). Data sets and/or applications implemented on cloud resources that are associated with a particular tenant are tagged with the tenant ID of the particular tenant. Before access to a particular data set or application is permitted, the tenant ID is verified to determine whether the corresponding tenant has authorization to access the particular data set or application.

In an embodiment, data sets corresponding to various tenants are stored as entries in a database. Each entry is tagged with the tenant ID of the corresponding tenant. A request for access to a particular data set is tagged with the tenant ID of the tenant making the request. The tenant ID associated with the request is checked against the tenant ID associated with the database entry of the data set to be accessed. If the tenant IDs are the same, then access to the database entry is permitted.

In an embodiment, data sets corresponding to various tenants are stored in different databases or data structures. Each database or data structure is tagged with the tenant ID of the corresponding tenant. A request for access to a particular data set is tagged with the tenant ID of the tenant making the request. The tenant ID associated with the request is checked against the tenant ID associated with the database or data structure storing the data set to be accessed. If the tenant IDs are the same, then access to the database or data structure is permitted.

In an embodiment, a subscription list indicates which tenants have authorization to access which applications. For each application, a list of tenant Ms of each tenant having authorization to access the application is stored. A request for access to a particular application is tagged with the tenant ID of the tenant making the request. The tenant ID associated with the request is checked against the subscription list to determine whether the tenant is authorized to access the application. If the tenant ID associated with the request is included in the list of tenant IDs of tenants having authorization to access the application, then access to the application is permitted.

In an embodiment, data sets and virtual resources (e.g., virtual machines, application instances, and threads) corresponding to different tenants are isolated to tenant-specific overlay networks maintained by the cloud environment. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
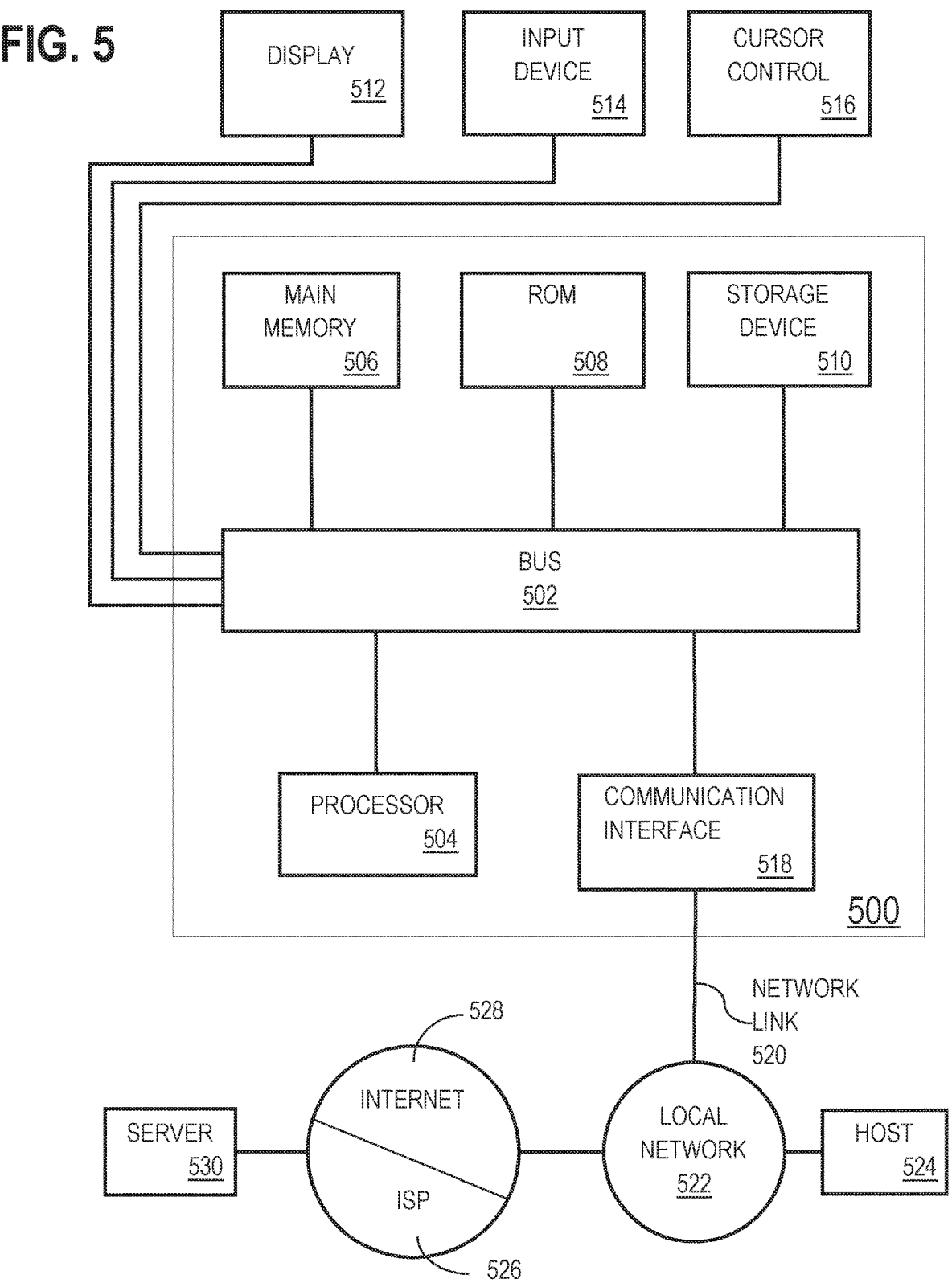
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 52.0 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   identifying data traffic being transmitted on a communication link from a first node to a second node;
   determining a physical characteristic associated with a physical cable between the first node and the second node;
   based at least on the physical characteristic associated with the physical cable, selecting a first level of test traffic to transmit on the communication link from the first node to the second node;
   transmitting the first level of test traffic, concurrently with the data traffic being transmitted on the communication link, from the first node to the second node;
   while testing using the first level of test traffic remains incomplete:
      receiving, by the first node from the second node, a test modification message;
      wherein the test modification message comprises a second level of test traffic to be transmitted on the communication link, and the second level of test traffic is determined by the second node based on a change in a characteristic associated with the data traffic transmitted between the first node and the second node;
   responsive to receiving the test modification message:
      transmitting the second level of test traffic, rather than the first level of test traffic, concurrently with the data traffic transmitted between the first node and the second node.

2. The medium of claim 1, wherein selecting the first level of test traffic is further based on a current level of the data traffic such that a level of a combination of the test traffic and the data traffic exceeds a threshold value.

3. The medium of claim 1, wherein the first level of test traffic is selected using an inversely proportional function of a current level of data traffic.

4. The medium of claim 1, wherein the operations further comprise selecting a duration of time for transmitting the test traffic on the communication link based on at least one of (a) a current level of data traffic and (b) the physical characteristic associated with the physical cable.

5. The medium of claim 1, wherein: the physical characteristic associated with the physical cable comprises at least one of: a material, a temperature, and a length of the physical cable.

6. The medium of claim 1, wherein the operations further comprise:
   prior to transmitting the test traffic: shifting at least a portion of the data traffic to a different communication link than said communication link.

7. The medium of claim 1, wherein:
   the data traffic is transmitted between the first node and the second node using a first pair of identifiers associated respectively with the first node and the second node; and
   the test traffic is transmitted between the first node and the second node using a second pair of identifiers associated respectively with the first node and the second node.

8. The medium of claim 1, wherein the transmitting operation is performed periodically according to a schedule.

9. The medium of claim 1, wherein the transmitting operation is performed using an acyclic schedule.

10. The medium of claim 1, wherein the selecting operation is executed by a master node that is different than a set of nodes connected by the communication link.

11. The medium of claim 1, wherein the operations further comprise:
   selecting either the first node or the second node as a master node based on a topology of a computer network associated with the first node and the second node;
   wherein the operation of selecting the first level of test traffic is executed by the master node.

12. The medium of claim 1, wherein the operations further comprise:
   generating a first discovery message comprising a first identifier of the first node;
   broadcasting, by the first node, the first discovery message;
   subsequent to broadcasting the first discovery message:
      receiving a second discovery message that was broadcasted by the second node;
   wherein transmitting the first level of test traffic is responsive at least to determining that the second discovery message includes the first identifier of the first node and a second identifier of the second node.

13. The medium of claim 1, wherein the operations further comprise:
   determining test results associated with transmission of the test traffic; and
   based at least on the test results, modifying transmission of data traffic on the communication link.

14. The medium of claim 1, wherein the operations further comprise:
   aggregating test results associated with transmission of sets of test traffic on a plurality of communication links; and
   based at least on the aggregated test results: modifying transmission of data traffic on the communication link.

15. The medium of claim 1, wherein:
   the operations further comprise:
      based on a particular type, of a plurality of types, of the data traffic being transmitted on the communication link, selecting a third level of test traffic to transmit on the communication link from the second node to the first node; and
      transmitting the third level of test traffic, from the second node to the first node, concurrently with the data traffic being transmitted on the communication link.

16. The medium of claim 1, wherein:
   the first level of test traffic is selected using an inversely proportional function of a current level of data traffic;
   the physical characteristic associated with the physical cable comprises at least one of:
      a material, a temperature, and a length of the physical cable;
   the selecting operation and the transmitting operation are performed in accordance with a protocol implemented by the first node and the second node;
   the transmitting operation is performed using an acyclic schedule;
   the data traffic is transmitted between the first node and the second node using a first pair of identifiers associated respectively with the first node and the second node;

the test traffic is transmitted between the first node and the second node using a second pair of identifiers associated respectively with the first node and the second node;

the operations further comprise:

generating a first discovery message comprising a first identifier of the first node;

broadcasting, by the first node, the first discovery message;

subsequent to broadcasting the first discovery message:
receiving a second discovery message that was broadcasted by the second node;

wherein transmitting the first level of test traffic is responsive at least to determining that the second discovery message includes the first identifier of the first node and a second identifier of the second node;

wherein each of the first discovery message and the second discovery message is addressed to at least one of a broadcast address and a multicast address;

wherein each of the first discovery message and the second discovery message is broadcasted over Layer 2 of the Open Systems Interconnection (OSI) model;

prior to transmitting the test traffic: shifting at least a portion of the data traffic to a different communication link than said communication link;

selecting a duration of time for transmitting the test traffic on the communication link based on at least one of the current level of data traffic and the physical characteristic associated with the physical cable;

selecting either the first node or the second node as a master node based on a topology of a computer network associated with the first node and the second node;

wherein the operation of selecting the first level of test traffic is executed by the master node;

wherein selecting either the first node or the second node as the master node based on the topology of the computer network associated with the first node and the second node comprises:

identifying a default gateway for routing data in and out of the computer network;

selecting either the first node or the second node as the master node based on whether the first node or the second node is closer to the default gateway;

based on a particular type, of a plurality of types, of the data traffic being transmitted on the communication link, selecting a third level of test traffic to transmit on the communication link from the second node to the first node;

transmitting the third level of test traffic, from the second node to the first node, concurrently with the data traffic being transmitted on the communication link;

aggregating test results associated with transmission of sets of test traffic on a plurality of communication links; and based at least on the aggregated test results: modifying transmission of data traffic on the communication link.

17. A system comprising:
at least one hardware device including a processor; and
the system configured to perform operations comprising:
identifying data traffic being transmitted on a communication link from a first node to a second node;

determining a physical characteristic associated with a physical cable between the first node and the second node;

based at least on the physical characteristic associated with the physical cable, selecting a first level of test traffic to transmit on the communication link from the first node to the second node;

transmitting the first level of test traffic, concurrently with the data traffic being transmitted on the communication link, from the first node to the second node;

while testing using the first level of test traffic remains incomplete:
receiving, by the first node from the second node, a test modification message;
wherein the test modification message comprises a second level of test traffic to be transmitted on the communication link, and the second level of test traffic is determined by the second node based on a change in a characteristic associated with the data traffic transmitted between the first node and the second node;

responsive to receiving the test modification message:
transmitting the second level of test traffic, rather than the first level of test traffic, concurrently with the data traffic transmitted between the first node and the second node.

18. A method comprising:
identifying data traffic being transmitted on a communication link from a first node to a second node;
determining a physical characteristic associated with a physical cable between the first node and the second node;
based at least on the physical characteristic associated with the physical cable, selecting a first level of test traffic to transmit on the communication link from the first node to the second node;
transmitting the first level of test traffic, concurrently with the data traffic being transmitted on the communication link, from the first node to the second node;
while testing using the first level of test traffic remains incomplete:
receiving, by the first node from the second node, a test modification message;
wherein the test modification message comprises a second level of test traffic to be transmitted on the communication link, and the second level of test traffic is determined by the second node based on a change in a characteristic associated with the data traffic transmitted between the first node and the second node;
responsive to receiving the test modification message:
transmitting the second level of test traffic, rather than the first level of test traffic, concurrently with the data traffic transmitted between the first node and the second node;
wherein the method is performed by at least one hardware device including a processor.

19. The medium of claim 1, wherein the operations further comprise:
transmitting, from the first node to the second node, a test initiation message comprising the selected first level of test traffic;
receiving, by the first node from the second node, a test initiation acknowledgement message;
wherein transmitting the first level of test traffic is responsive at least to receiving the test initiation acknowledgement message.

20. The medium of claim 11, wherein selecting either the first node or the second node as the master node based on the topology of the computer network associated with the first node and the second node comprises:
- identifying a default gateway for routing data in and out of the computer network;
- selecting either the first node or the second node as the master node based on whether the first node or the second node is closer to the default gateway.

21. The medium of claim 12, wherein each of the first discovery message and the second discovery message is broadcasted over Layer 2 of the Open Systems Interconnection (OSI) model.

22. The medium of claim 12, wherein each of the first discovery message and the second discovery message is broadcasted using at least one of a media access control (MAC) broadcast address and a MAC multi-cast address.

23. The method of claim 18, wherein: the physical characteristic associated with the physical cable comprises at least one of: a material, a temperature, and a length of the physical cable.

* * * * *

UNITED STATES PATENT AND TRADEMARK OFFICE
CERTIFICATE OF CORRECTION

PATENT NO. : 10,771,372 B2
APPLICATION NO. : 15/184918
DATED : September 8, 2020
INVENTOR(S) : Hill et al.

It is certified that error appears in the above-identified patent and that said Letters Patent is hereby corrected as shown below:

In the Specification

In Column 1, Line 3, below "TRANSMITTING TEST TRAFFIC ON A COMMUNICATION LINK" insert -- TECHNICAL FIELD The present disclosure relates to communication links. In particular, the present disclosure relates to transmitting test traffic on a communication link. --.

In Column 2, Line 51, delete "node," and insert -- node. --, therefor.

In Column 3, Line 52, delete "address)" and insert -- address). --, therefor.

In Column 3, Line 57, delete "anal" and insert -- and --, therefor.

In Column 7, Line 14, delete "Node X" and insert -- Node X, --, therefor.

In Column 9, Line 30, delete "he" and insert -- be --, therefor.

In Column 10, Line 6, delete "function" and insert -- Function --, therefor.

In Column 10, Line 61, delete "Y" and insert -- Y. --, therefor.

In Column 10, Line 62, delete "Port D)" and insert -- Port D --, therefor.

In Column 14, Line 66, delete "stave" and insert -- slave --, therefor.

In Column 19, Line 46, delete "410," and insert -- 410. --, therefor.

In Column 19, Line 50, delete "412," and insert -- 412. --, therefor.

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,771,372 B2

In Column 21, Line 53, delete "Ms" and insert -- IDs --, therefor.

In Column 24, Line 50, delete "52.0" and insert -- 520 --, therefor.